(12) United States Patent
Kasada

(10) Patent No.: US 11,087,793 B2
(45) Date of Patent: Aug. 10, 2021

(54) MAGNETIC TAPE WITH PARTICULAR REFRACTIVE INDEX CHARACTERISTICS, MAGNETIC TAPE CARTRIDGE, AND MAGNETIC TAPE APPARATUS

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/727,181

(22) Filed: Dec. 26, 2019

(65) Prior Publication Data

US 2020/0211592 A1 Jul. 2, 2020

(30) Foreign Application Priority Data

Dec. 28, 2018 (JP) .............................. JP2018-246871

(51) Int. Cl.
| | | |
|---|---|---|
| *G11B 5/62* | (2006.01) | |
| *G11B 5/74* | (2006.01) | |
| *G11B 5/735* | (2006.01) | |
| *G11B 23/107* | (2006.01) | |
| *G11B 5/706* | (2006.01) | |
| *G11B 5/596* | (2006.01) | |
| *G11B 5/70* | (2006.01) | |

(52) U.S. Cl.
CPC ........ *G11B 5/7358* (2019.05); *G11B 5/59688* (2013.01); *G11B 5/70* (2013.01); *G11B 5/706* (2013.01); *G11B 5/70605* (2013.01); *G11B 5/70689* (2013.01); *G11B 23/107* (2013.01)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| CN | 1630680 A | 6/2005 |
| CN | 1691139 A | 11/2005 |

(Continued)

OTHER PUBLICATIONS

U.S. Appl. No. 16/361,589, Allowed; RCE filed.

(Continued)

*Primary Examiner* — Jefferson A Evans
(74) *Attorney, Agent, or Firm* — Sughrue Mion, PLLC

(57) ABSTRACT

Provided are a magnetic tape including: a non-magnetic support; and a magnetic layer including ferromagnetic powder and a binding agent on the non-magnetic support, in which a total thickness of the magnetic tape is equal to or smaller than 5.30 μm, the magnetic layer has a servo pattern, a center line average surface roughness Ra measured on a surface of the magnetic layer is equal to or smaller than 1.8 nm, and an absolute value ΔN of a difference between a refractive index Nxy of the magnetic layer, measured in an in-plane direction and a refractive index Nz of the magnetic layer, measured in a thickness direction is 0.25 to 0.40, a magnetic tape cartridge and a magnetic tape apparatus including this magnetic tape, a magnetic tape cartridge and a magnetic tape apparatus including this magnetic tape.

20 Claims, 3 Drawing Sheets

(56) References Cited

U.S. PATENT DOCUMENTS

| | | | |
|---|---|---|---|
| 4,425,404 A | 1/1984 | Suzuki et al. |
| 4,590,119 A | 5/1986 | Kawakami et al. |
| 4,693,930 A | 9/1987 | Kuo et al. |
| 4,731,292 A | 3/1988 | Sasaki et al. |
| 4,746,569 A | 5/1988 | Takahashi et al. |
| 4,818,606 A | 4/1989 | Koyama et al. |
| 4,825,317 A | 4/1989 | Rausch |
| 5,006,406 A | 4/1991 | Kovacs et al. |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,282,051 B1 | 8/2001 | Albrecht et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,341,798 B2 * | 3/2008 | Hirai ..................... G11B 5/584 |
| | | 428/840.1 |
| 7,474,505 B2 * | 1/2009 | Hirai ................... G11B 5/73913 |
| | | 360/134 |
| 7,511,907 B2 | 3/2009 | Dugas et al. |
| 7,515,383 B2 | 4/2009 | Saito et al. |
| 7,656,602 B2 | 2/2010 | Iben et al. |
| 7,755,863 B2 | 7/2010 | Neumann et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 | 9/2013 | Imaoka |
| 8,576,510 B2 | 11/2013 | Cherubini et al. |
| 8,609,264 B2 * | 12/2013 | Mitsuoka ..................... C08J 5/18 |
| | | 360/134 |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa et al. |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,347,280 B2 | 7/2019 | Kasada et al. |
| 10,373,633 B2 | 8/2019 | Kaneko et al. |
| 10,373,639 B2 | 8/2019 | Kasada et al. |
| 10,403,314 B2 | 9/2019 | Kasada et al. |
| 10,403,319 B2 | 9/2019 | Kasada |
| 10,403,320 B2 | 9/2019 | Kasada et al. |
| 10,410,666 B2 | 9/2019 | Kasada et al. |
| 10,431,248 B2 | 10/2019 | Kasada et al. |
| 10,431,249 B2 | 10/2019 | Kasada et al. |
| 10,431,250 B2 | 10/2019 | Tada et al. |
| 10,438,624 B2 | 10/2019 | Kasada |
| 10,438,625 B2 | 10/2019 | Ozawa et al. |
| 10,438,628 B2 | 10/2019 | Kasada et al. |
| 10,453,488 B2 | 10/2019 | Kurokawa et al. |
| 10,460,756 B2 | 10/2019 | Kasada et al. |
| 10,475,481 B2 | 11/2019 | Oyanagi et al. |
| 10,477,072 B2 | 11/2019 | Kasada |
| 10,482,913 B2 | 11/2019 | Kasada |
| 10,490,220 B2 | 11/2019 | Kasada et al. |
| 10,497,384 B2 | 12/2019 | Kasada et al. |
| 10,497,388 B2 | 12/2019 | Ozawa et al. |
| 10,510,366 B2 | 12/2019 | Kaneko et al. |
| 10,515,657 B2 | 12/2019 | Kasada et al. |
| 10,515,660 B2 | 12/2019 | Oyanagi et al. |
| 10,515,661 B2 | 12/2019 | Kasada et al. |
| 10,522,171 B2 | 12/2019 | Kasada et al. |
| 10,522,180 B2 | 12/2019 | Kasada |
| 10,546,602 B2 | 1/2020 | Kasada et al. |
| 10,573,338 B2 | 2/2020 | Kasada et al. |
| 10,643,646 B2 | 5/2020 | Kasada et al. |
| 10,672,426 B2 | 6/2020 | Kasada |
| 10,706,875 B2 | 7/2020 | Kasada et al. |
| 10,755,741 B2 | 8/2020 | Ozawa et al. |
| 10,839,850 B2 | 11/2020 | Tada et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 * | 5/2003 | Ejiri ..................... G11B 5/70 |
| | | 428/818 |
| 2003/0124386 A1 | 7/2003 | Masaki |
| 2003/0128453 A1 | 7/2003 | Saito et al. |
| 2003/0170498 A1 | 9/2003 | Inoue |
| 2003/0203240 A1 * | 10/2003 | Seng ..................... G11B 5/718 |
| | | 428/839 |
| 2003/0228492 A1 | 12/2003 | Ejiri et al. |
| 2003/0228493 A1 | 12/2003 | Doushita et al. |
| 2004/0013892 A1 * | 1/2004 | Yano ..................... C09D 167/00 |
| | | 428/482 |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |

(56) References Cited

U.S. PATENT DOCUMENTS

| | | |
|---|---|---|
| 2004/0265643 A1 | 12/2004 | Ejiri |
| 2005/0020803 A1 | 1/2005 | Machida et al. |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0083954 A1* | 4/2006 | Meguro ............... G11B 5/7305 428/847 |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2009/0174970 A1* | 7/2009 | Inoue ....................... G11B 5/70 360/324 |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2010/0284105 A1 | 11/2010 | Dugas et al. |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0003503 A1 | 1/2012 | Mori |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2012/0314319 A1 | 12/2012 | Olson et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0171993 A1 | 6/2016 | Okubo |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0092316 A1* | 3/2017 | Imamura ................ G11B 5/842 |
| 2017/0130156 A1 | 5/2017 | Kondo et al. |
| 2017/0162220 A1 | 6/2017 | Nakashio et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |

(56) References Cited

U.S. PATENT DOCUMENTS

| | | | |
|---|---|---|---|
| 2018/0286442 A1 | 10/2018 | Ozawa et al. | |
| 2018/0286443 A1 | 10/2018 | Ozawa et al. | |
| 2018/0286444 A1 | 10/2018 | Kasada et al. | |
| 2018/0286447 A1 | 10/2018 | Ozawa et al. | |
| 2018/0286448 A1 | 10/2018 | Ozawa et al. | |
| 2018/0286449 A1 | 10/2018 | Kasada et al. | |
| 2018/0286450 A1 | 10/2018 | Kasada et al. | |
| 2018/0286451 A1 | 10/2018 | Ozawa et al. | |
| 2018/0286452 A1 | 10/2018 | Ozawa et al. | |
| 2018/0286453 A1 | 10/2018 | Kasada et al. | |
| 2018/0301165 A1 | 10/2018 | Oyanagi et al. | |
| 2018/0350398 A1* | 12/2018 | Kawakami | G11B 5/82 |
| 2018/0350400 A1 | 12/2018 | Kaneko et al. | |
| 2018/0358042 A1 | 12/2018 | Kasada et al. | |
| 2018/0374504 A1 | 12/2018 | Kasada | |
| 2018/0374507 A1 | 12/2018 | Kasada | |
| 2019/0027167 A1 | 1/2019 | Tada et al. | |
| 2019/0027168 A1 | 1/2019 | Kasada et al. | |
| 2019/0027177 A1 | 1/2019 | Kasada | |
| 2019/0027178 A1 | 1/2019 | Kasada | |
| 2019/0035424 A1 | 1/2019 | Endo | |
| 2019/0051325 A1 | 2/2019 | Kasada et al. | |
| 2019/0088278 A1 | 3/2019 | Kasada et al. | |
| 2019/0096437 A1 | 3/2019 | Ozawa et al. | |
| 2019/0103130 A1 | 4/2019 | Kasada et al. | |
| 2019/0103131 A1 | 4/2019 | Kasada et al. | |
| 2019/0103133 A1 | 4/2019 | Ozawa et al. | |
| 2019/0103134 A1 | 4/2019 | Kasada et al. | |
| 2019/0103135 A1 | 4/2019 | Ozawa et al. | |
| 2019/0130936 A1 | 5/2019 | Kaneko et al. | |
| 2019/0259416 A1 | 8/2019 | Kawakami et al. | |
| 2019/0295581 A1 | 9/2019 | Kasada | |
| 2019/0295586 A1 | 9/2019 | Kasada | |
| 2019/0295587 A1 | 9/2019 | Kasada | |
| 2019/0295588 A1 | 9/2019 | Kasada | |
| 2019/0295589 A1 | 9/2019 | Kasada | |
| 2019/0295590 A1 | 9/2019 | Kaneko et al. | |
| 2019/0304496 A1 | 10/2019 | Fujimoto | |
| 2020/0005814 A1 | 1/2020 | Kasada et al. | |
| 2020/0005818 A1 | 1/2020 | Kasada et al. | |
| 2020/0005827 A1 | 1/2020 | Ozawa et al. | |
| 2020/0035262 A1 | 1/2020 | Kasada | |
| 2020/0035265 A1 | 1/2020 | Kasada | |
| 2020/0126589 A1 | 4/2020 | Iwamoto et al. | |
| 2020/0211593 A1 | 7/2020 | Kasada | |
| 2020/0227081 A1 | 7/2020 | Hosoda et al. | |
| 2020/0227084 A1 | 7/2020 | Iwamoto et al. | |
| 2020/0243110 A1 | 7/2020 | Kasada | |
| 2020/0251135 A1 | 8/2020 | Kasada et al. | |
| 2020/0251139 A1 | 8/2020 | Kasada et al. | |
| 2021/0020195 A1 | 1/2021 | Kasada | |
| 2021/0090599 A1 | 3/2021 | Nakano et al. | |

FOREIGN PATENT DOCUMENTS

| | | |
|---|---|---|
| CN | 101105949 A | 1/2008 |
| CN | 102459429 A | 5/2012 |
| CN | 105324650 A | 2/2016 |
| DE | 101 46 429 A1 | 3/2002 |
| EP | 0 421 213 A2 | 4/1991 |
| EP | 0 520 155 B1 | 8/1996 |
| GB | 2495356 A | 4/2013 |
| JP | 60-171626 A | 9/1985 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 1-276424 A | 11/1989 |
| JP | 2-168415 A | 6/1990 |
| JP | 2-227821 A | 9/1990 |
| JP | 4-123312 A | 4/1992 |
| JP | 5-258283 A | 10/1993 |
| JP | 5-298653 A | 11/1993 |
| JP | 7-57242 A | 3/1995 |
| JP | 7-114723 A | 5/1995 |
| JP | 9-73626 A | 3/1997 |
| JP | 9-190623 A | 7/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-8910 A | 1/2002 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-29656 A | 2/2005 |
| JP | 2005-038579 A | 2/2005 |
| JP | 2005-243063 A | 9/2005 |
| JP | 2005-243162 A | 9/2005 |
| JP | 2006-54018 A | 2/2006 |
| JP | 2006-92672 A | 4/2006 |
| JP | 2006-257434 A | 9/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-093738 A | 4/2009 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-134372 A | 7/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2012-203956 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-110680 A | 6/2016 |
| JP | 2016-126817 A | 7/2016 |
| JP | 2016-139451 A | 8/2016 |
| JP | 2016-177851 A | 10/2016 |
| JP | 2017-16732 A | 1/2017 |
| JP | 2017-041291 A | 2/2017 |
| JP | 2017-041296 A | 2/2017 |
| JP | 2017-228328 A | 12/2017 |
| JP | 2018-73454 A | 5/2018 |

(56) References Cited

FOREIGN PATENT DOCUMENTS

| | | |
|---|---|---|
| WO | 2019/065199 A1 | 4/2019 |
| WO | 2019/065200 A1 | 4/2019 |

OTHER PUBLICATIONS

U.S. Appl. No. 16/522,867, Allowed.
U.S. Appl. No. 16/522,894, Allowed; RCE filed.
U.S. Appl. No. 16/832,284, Pending.
U.S. Appl. No. 16/832,788, Pending.
International Preliminary Report on Patentability dated Mar. 31, 2020 in International Application No. PCT/JP2018/033530, corresponding to U.S. Appl. No. 16/832,284.
International Preliminary Report on Patentability dated Mar. 31, 2020 in International Application No. PCT/JP2018/033531, corresponding to U.S. Appl. No. 16/832,788.
International Search Report dated Nov. 20, 2018 in International Application No. PCT/JP2018/033530, corresponding to U.S. Appl. No. 16/832,284.
International Search Report dated Nov. 20, 2018 in International Application No. PCT/JP2018/033531, corresponding to U.S. Appl. No. 16/832,788.
Notice of Allowance dated Jul. 28, 2020 in U.S. Appl. No. 16/361,589.
Notice of Allowance dated Jul. 29, 2020 in U.S. Appl. No. 16/361,597.
Notice of Allowance dated Sep. 17, 2020 in U.S. Appl. No. 16/522,867.
Office Action dated Jul. 20, 2020 in U.S. Appl. No. 16/777,411.
Office Action dated Mar. 13, 2020 in U.S. Appl. No. 16/361,589.
Office Action dated Mar. 13, 2020 in U.S. Appl. No. 16/361,597.
Office Action dated Mar. 13, 2020 in U.S. Appl. No. 16/522,867.
Office Action dated Sep. 15, 2020 in U.S. Appl. No. 16/832,284.
Office Action dated Sep. 15, 2020 in U.S. Appl. No. 16/832,788.
Office Action dated Sep. 23, 2020 in Japanese Application No. 2019-050202, corresponds to U.S. Appl. No. 16/361,589.
Office Action dated Sep. 29, 2020 in Japanese Application No. 2018-141866, corresponds to U.S. Appl. No. 16/522,867.
Office Action dated Sep. 29, 2020 in Japanese Application No. 2018-141867, corresponds to U.S. Appl. No. 16/522,894.
Office Action dated Sep. 29, 2020 in Japanese Application No. 2018-246871, corresponds to U.S. Appl. No. 16/727,181 (i.e., the present application).
Written Opinion dated Nov. 20, 2018 in International Application No. PCT/JP2018/033530, corresponding to U.S. Appl. No. 16/832,284.
Written Opinion dated Nov. 20, 2018 in International Application No. PCT/JP2018/033531, corresponding to U.S. Appl. No. 16/832,788.
Notice of Allowance dated Jun. 23, 2020 in U.S. Appl. No. 16/522,894.
Office Action dated Mar. 2, 2020 in U.S. Appl. No. 16/522,894.
Notice of Allowance dated Nov. 5, 2020 in U.S. Appl. No. 16/361,597.
Notice of Allowance dated Nov. 12, 2020 in U.S. Appl. No. 16/777,411.
Office Action dated Nov. 3, 2020 in Chinese Application No. 201880063019.7; corresponds to U.S. Appl. No. 16/832,788.
Office Action dated Nov. 6, 2020 in Chinese Application No. 201880062980.4; corresponds to U.S. Appl. No. 16/832,284.
Advisory Action dated Jul. 5, 2018 in U.S. Appl. No. 14/838,663.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.

(56) References Cited

OTHER PUBLICATIONS

Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543 Machine Translation; corresponds to U.S. Appl. No. 14/209,065.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022 Machine Translation; corresponds to U.S. Appl. No. 14/867,752.
Office Action dated Oct. 15, 2018, which issued during the prosecution of U.S. Appl. No. 15/854,403.

(56) References Cited

OTHER PUBLICATIONS

Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723 Machine Translation; corresponds to U.S. Appl. No. 14/978,834.
Office Action dated Sep. 26, 2017 issued by the Japanese Patent Office in JP Appln. No. 2015-249264 Machine Translation; corresponds to U.S. Appl. No. 14/757,555.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851 Machine Translation; corresponds to U.S. Appl. No. 15/690,906.
Office Action dated Apr. 23, 2019 in Japanese Application No. 2016-182230 Machine Translation; corresponds to U.S. Appl. No. 15/705,531.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428 Machine Translation; corresponds to U.S. Appl. No. 15/854,403.
Office Action dated Aug. 27, 2019 in Japanese Application No. 2016-254430 Machine Translation; corresponds to U.S. Appl. No. 15/854,409.
Office Action dated Aug. 27, 2019 in Japanese Application No. 2016-254432 Machine Translation; corresponds to U.S. Appl. No. 15/854,397.
Office Action dated Aug. 28, 2019 in U.S. Appl. No. 15/854,397.
Office Action dated Aug. 6, 2019 in Japanese Application No. 2016-254421 Machine Translation; corresponds to U.S. Appl. No. 15/854,383.
Office Action dated Aug. 6, 2019 in Japanese Application No. 2016-254427 Machine Translation; corresponds to U.S. Appl. No. 15/848,173.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144 Machine Translation; corresponds to U.S. Appl. No. 15/378,907.
Office Action dated Dec. 25, 2018 in Japanese Application No. 2015-245145 Machine Translation; corresponds to U.S. Appl. No. 15/380,336.
Office Action dated Dec. 25, 2018 in Japanese Application No. 2015-254192 Machine Translation; corresponds to U.S. Pat. No. 9,773,519.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207 Machine Translation; corresponds to U.S. Appl. 15/619,012.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339 Machine Translation; corresponds to U.S. Appl. No. 16/100,289.
Office Action dated Feb. 5, 2019 in Japanese Application No. 2016-123205 Machine Translation; corresponds to U.S. Appl. No. 15/620,916.
Office Action dated Feb. 5, 2019 in Japanese Application No. 2016-169871 Machine Translation; corresponds to U.S. Appl. No. 15/690,400.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933 Machine Translation, corresponds to U.S. Appl. No. 15/627,696.
Office Action dated Jun. 10, 2019 in U.S. Appl. No. 15/920,518.
Office Action dated Jun. 25, 2019 in Japanese Application No. 2015-245144 Machine Translation; corresponds to U.S. Appl. No. 15/378,907.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261 Machine Translation; corresponds to U.S. Appl. No. 15/614,876.
Office Action dated Mar. 19, 2019 in Japanese Application No. 2016-124515 Machine Translation; corresponds to U.S. Appl. No. 15/621,464.
Office Action dated Mar. 19, 2019 in Japanese Application No. 2016-124529 Machine Translation; corresponds to U.S. Appl. No. 15/628,814.
Office Action dated Mar. 19, 2019 in Japanese Application No. 2016-124932 Machine Translation; corresponds to U.S. Appl. No. 15/626,720.
Office Action dated Mar. 19, 2019 in Japanese Application No. 2016-124933 Machine Translation; corresponds to U.S. Appl. No. 15/627,696.
Office Action dated Mar. 19, 2019 in Japanese Application No. 2016-124935 Machine Translation; corresponds to U.S. Appl. No. 15/626,355.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499 Machine Translation; corresponds to U.S. Appl. No. 15/900,106.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436 Machine Translation; corresponds to U.S. Appl. No. 15/854,507.

(56) References Cited

OTHER PUBLICATIONS

Office Action dated Sep. 24, 2019 in Japanese Application No. 2016-254439 Machine Translation; corresponds to U.S. Appl. No. 16/232,165.
Office Action dated Sep. 24, 2019 in Japanese Application No. 2016-254441 Machine Translation; corresponds to U.S. Appl. No. 15/854,474.
Office Action dated Sep. 24, 2019 in Japanese Application No. 2016-254450 Machine Translation; corresponds to U.S. Appl. No. 15/854,410.
Office Action dated Sep. 24, 2019 in Japanese Application No. 2017-029491 Machine Translation; corresponds to U.S. Appl. No. 15/899,587.
Office Action dated Sep. 24, 2019 in Japanese Application No. 2017-029508 Machine Translation; corresponds to U.S. Appl. No. 15/900,345.
Office Action dated Sep. 24, 2019 in Japanese Application No. 2017-065730 Machine Translation; corresponds to U.S. Appl. No. 16/160,377.
Office Action dated Sep. 3, 2019 in Japanese Application No. 2016-254434 Machine Translation, corresponds to U.S. Appl. No. 15/854,329.
Office Action dated Oct. 1, 2019 in Japanese Application No. 2017-029495 Machine Translation; corresponds to U.S. Appl. No. 15/900,141.
Office Action dated Oct. 1, 2019 in Japanese Application No. 2017-029493 Machine Translation; corresponds to U.S. Appl. No. 15/900,144.
Office Action dated Oct. 1, 2019 in Japanese Application No. 2017-029494 Machine Translation; corresponds to U.S. Appl. No. 15/900,080.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492 Machine Translation; corresponds to U.S. Appl. No. 15/899,430.
Office Action dated Oct. 8, 2019 in Japanese Application No. 2017-065700 Machine Translation corresponds to U.S. Appl. No. 15/920,544.
Office Action dated Oct. 8, 2019 in Japanese Application No. 2017-065708 Machine Translation; corresponds to U.S. Appl. No. 16/182,083.
Office Action dated Oct. 8, 2019 in Japanese Application No. 2017-065678 Machine Translation; corresponds to U.S. Appl. No. 15/920,538.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428 Machine Translation; corresponds to U.S. Appl. No. 15/854,403.
Office Action dated Dec. 17, 2019 in Japanese Application No. 2016-254430 English Translation; corresponds to U.S. Appl. No. 15/854,409.
Office Action dated Dec. 17, 2019 in Japanese Application No. 2016-254432 English Translation; corresponds to U.S. Appl. No. 15/854,397.
Office Action dated Dec. 17, 2019 in Japanese Application No. 2017-029507 English Translation; corresponds to U.S. Appl. No. 15/900,242.
Office Action dated Dec. 24, 2019 in Japanese Application No. 2016-254434 English Translation; corresponds to U.S. Appl. No. 15/854,329.
Office Action dated Dec. 24, 2019 in Japanese Application No. 2017-029510 English Translation; corresponds to U.S. Appl. No. 15/900,230.
Office Action dated Nov. 26, 2019 in Japanese Application No. 2016-254421 Machine Translation; corresponds to U.S. Appl. No. 15/854,383.
Office Action dated Nov. 26, 2019 in Japanese Application No. 2017-029496 Machine Translation; corresponds to U.S. Appl. No. 16/044,574.
Office Action dated Nov. 26, 2019 in Japanese Application No. 2017-029502 Machine Translation; corresponds to U.S. Appl. No. 15/900,379.
Office Action dated Nov. 26, 2019 in Japanese Application No. 2017-065694 Machine Translation; corresponds to U.S. Appl. No. 15/920,518.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/142,560.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Office Action dated Aug. 25, 2020 in Chinese Application No. 201711439496.2 English Translation, corresponds to U.S. Appl. No. 15/848,173.
Office Action dated Jul. 8, 2020 in U.S. Appl. No. 15/442,961.
Notice of Allowance dated Sep. 23, 2020 in U.S. Appl. No. 15/443,094.

(56) References Cited

OTHER PUBLICATIONS

Notice of Allowance dated Nov. 13, 2020 in U.S. Appl. No. 15/442,961.
Office Action dated Sep. 27, 2019 in U.S. Appl. No. 16/361,570.
Communication dated Mar. 3, 2020 by the Japanese Patent Office in application No. 2017-123062; corresponds to U.S. Appl. No. 16/009,461.
Office Action dated Jun. 10, 2020 in U.S. Appl. No. 16/848,331.
Office Action dated Jun. 16, 2020 in U.S. Appl. No. 16/777,201.
Office Action dated Aug. 18, 2020 in U.S. Appl. No. 16/361,797.
Office Action dated Sep. 2, 2020 in U.S. Appl. No. 16/361,814.
Notice of Allowance dated Dec. 31, 2020 in U.S. Appl. No. 16/143,747.
Office Action dated Mar. 10, 2020 in U.S. Appl. No. 16/143,747.
Notice of Allowance dated Sep. 16, 2020 in U.S. Appl. No. 16/848,331.
Notice of Allowance dated Oct. 1, 2020 in U.S. Appl. No. 16/777,201.
Notice of Allowance dated Dec. 2, 2020 in U.S. Appl. No. 16/361,797.
Notice of Allowance dated Feb. 3, 2021 in U.S. Appl. No. 16/832,284.
Notice of Allowance dated Feb. 3, 2021 in U.S. Appl. No. 16/832,788.
Notice of Allowance dated Dec. 31, 2020 in U.S. Appl. No. 16/361,589.
Notice of Allowance dated Apr. 28, 2021 in U.S. Appl. No. 16/361,589.
Notice of Allowance dated Apr. 7, 2021 in U.S. Appl. No. 16/361,597.
Notice of Allowance dated Mar. 9, 2021 in U.S. Appl. No. 16/522,894.
Office Action dated Apr. 19, 2021 in U.S. Appl. No. 17/032,621.
Notice of Allowance dated Feb. 26, 2021 in U.S. Appl. No. 16/777,411.
U.S. Appl. No. 17/326,458, filed May 21, 2021 (Iwamoto).
U.S. Appl. No. 17/328,620, filed May 24, 2021 (Kasada).
U.S. Appl. No. 17/330,680, filed May 26, 2021 (Kasada).
U.S. Appl. No. 16/777,411, Allowed.
U.S. Appl. No. 16/361,589, Allowed.
U.S. Appl. No. 16/361,597, Allowed.
U.S. Appl. No. 16/522,867, now U.S. Pat. No. 10,902,574.
U.S. Appl. No. 16/522,894, Allowed.
U.S. Appl. No. 16/832,284, Allowed.
U.S. Appl. No. 16/832,788, Allowed; QPIDS filed; prosecution being reopened.
U.S. Appl. No. 17/032,621, Pending.
U.S. Appl. No. 17/326,458, Pending.
U.S. Appl. No. 17/328,620, Pending.
U.S. Appl. No. 17/330,680, Pending.
Office Action dated Jun. 17, 2021, in U.S. Appl. No. 16/522,894.

\* cited by examiner

MAGNETIC TAPE WITH PARTICULAR REFRACTIVE INDEX CHARACTERISTICS, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2018-246871 filed on Dec. 28, 2018. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

Magnetic recording media are divided into tape-shaped magnetic recording media and disk-shaped magnetic recording media, and tape-shaped magnetic recording media, that is, magnetic tapes (hereinafter, simply referred to as "tapes") are mainly used for data storage such as data back-up and archive. The recording of information on a magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technique of disposing a larger amount of data tracks in a width direction of the magnetic tape by narrowing the width of the data track to increase recording density is used.

However, in a case where the width of the data track is narrowed and the recording and/or reproducing of information is performed by allowing the running of the magnetic tape in a magnetic tape apparatus (normally referred to as a "drive"), it is difficult that a magnetic head correctly follows the data tracks due to the position change of the magnetic tape, and errors may easily occur at the time of recording and/or reproducing. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo pattern (servo signal) is formed in a magnetic layer of a magnetic tape, and this servo pattern is magnetically read to perform head tracking. More specific description is as follows.

First, a servo head reads a servo pattern formed in a magnetic layer (that is, reproduces a servo signal). A position of a magnetic head in a magnetic tape apparatus is controlled in accordance with a value obtained by reading the servo pattern. Accordingly, in a case of transporting the magnetic tape in the magnetic tape apparatus for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape apparatus, it is possible to control the position of the magnetic head in the width direction of the magnetic tape in the magnetic tape apparatus, by performing the head tracking servo. By doing so, it is possible to correctly record information on the magnetic tape and/or correctly reproduce information recorded on the magnetic tape in the magnetic tape apparatus.

By the way, a magnetic tape is generally accommodated in a magnetic tape cartridge, circulated, and used. In order to increase recording capacity for one reel of the magnetic tape cartridge, it is desirable to increase a total length of the magnetic tape accommodated in one reel of the magnetic tape cartridge. In order to increase the total length of the magnetic tape, it is necessary that a total thickness of the magnetic tape is thinned (hereinafter, also referred to as "thinning").

In recent years, the magnetic tape is required to increase the surface smoothness of the magnetic layer. Increasing the surface smoothness of the magnetic layer leads to the improvement of electromagnetic conversion characteristics.

In view of the point described above, the present inventor studied application of the magnetic tape with the thinned total thickness and the increased surface smoothness of the magnetic layer to the servo system. However, in the studies, it was clear that, in a case where the total thickness of the magnetic tape is thinned and the surface smoothness of the magnetic layer is increased, a phenomenon which has not been known in the related art occurs in which an occurrence frequency of a signal defect increases at the time of reproducing the servo signal in the servo system. As an example of such a signal defect, a signal defect called thermal asperity is used. The thermal asperity is fluctuation in a reproduced waveform caused by change of a resistance value of a magnetoresistive (MR) element due to occurrence of a local temperature change in the MR element in a system comprising an MR head on which the MR element is mounted. In a case where the signal defect occurs at the time of reproducing the servo signal, it is difficult to perform head tracking at the occurrence location. Accordingly, it is required to reduce the occurrence frequency of the signal defect at the time of reproducing the servo signal, in order to more correctly record information on the magnetic tape and/or more correctly reproduce information recorded on the magnetic tape by using the servo system.

According to an aspect of the invention, an object is to reduce an occurrence frequency of a signal defect in a servo system in a magnetic tape with a thinned total thickness and an increased surface smoothness of a magnetic layer.

According to an aspect of the invention, there is provided a magnetic tape comprising: a non-magnetic support; and a magnetic layer including ferromagnetic powder and a binding agent on the non-magnetic support, in which a total thickness of the magnetic tape is equal to or smaller than 5.30 μm, the magnetic layer has a servo pattern, a center line average surface roughness Ra measured on a surface of the magnetic layer (hereinafter, also referred to as a "magnetic layer surface roughness Ra") is equal to or smaller than 1.8 nm, and an absolute value ΔN (hereinafter, also referred to as "ΔN (of the magnetic layer)") of a difference between a refractive index Nxy of the magnetic layer, measured in an in-plane direction and a refractive index Nz of the magnetic layer, measured in a thickness direction is 0.25 to 0.40.

In an aspect, Nxy>Nz may be satisfied and the difference (Nxy−Nz) between the refractive index Nxy and the refractive index Nz may be 0.25 to 0.40.

In an aspect, the magnetic tape may further comprise a non-magnetic layer including non-magnetic powder and a binding agent between the non-magnetic support and the magnetic layer.

In an aspect, the total thickness of the magnetic tape may be 3.00 μm to 5.30 μm.

In an aspect, the magnetic tape may further comprise a back coating layer including non-magnetic powder and a binding agent on a surface of the non-magnetic support opposite to a surface provided with the magnetic layer.

In an aspect, the magnetic layer surface roughness Ra may be 1.2 nm to 1.8 nm.

In an aspect, the servo pattern may be a timing-based servo pattern.

According to another aspect of the invention, there is provided a magnetic tape cartridge comprising: the magnetic tape described above.

According to still another aspect of the invention, there is provided a magnetic tape apparatus comprising: the magnetic tape described above; and a magnetic head.

According to an aspect of the invention, it is possible to provide a magnetic tape which is thinned, has a servo pattern in a magnetic layer with high surface smoothness, and has a reduced occurrence frequency of a signal defect at the time of reproducing a servo signal in a servo system, and a magnetic tape cartridge and a magnetic tape apparatus including the magnetic tape.

DESCRIPTION OF THE PREFERRED EMBODIMENTS

Magnetic Tape

Figure 1:
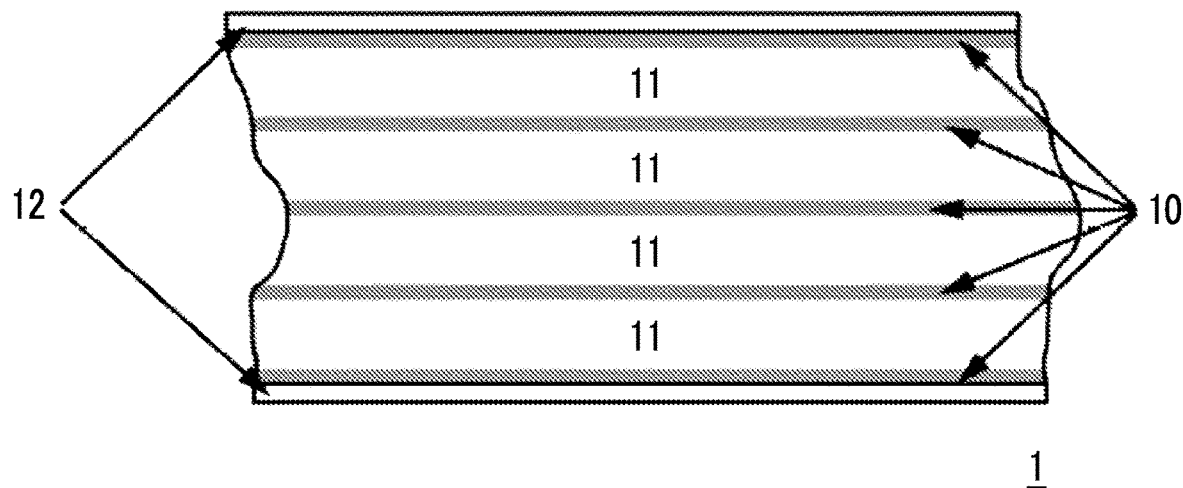
FIG. 1 shows an example of disposition of data bands and servo bands.

An aspect of the invention relates to a magnetic tape including a non-magnetic support; and a magnetic layer including ferromagnetic powder and a binding agent on the non-magnetic support, in which a total thickness of the magnetic tape is equal to or smaller than 5.30 μm, the magnetic layer has a servo pattern, a magnetic layer surface roughness Ra is equal to or smaller than 1.8 nm, and ΔN of the magnetic layer is 0.25 to 0.40.

Hereinafter, the magnetic tape will be described more specifically. The following description includes a surmise of the inventor. The invention is not limited to such a surmise. In addition, hereinafter, exemplary description may be made with reference to the drawings. However, the invention is not limited to the exemplified aspects.

Magnetic Layer

Magnetic Layer Surface Roughness Ra A center line average surface roughness Ra (magnetic layer surface roughness Ra) measured on a surface of the magnetic layer of the magnetic tape is equal to or smaller than 1.8 nm. In the magnetic tape having the magnetic layer surface roughness Ra of equal to or smaller than 1.8 nm and the total thickness of equal to or smaller than 5.30 μm, in a case where no measures are taken, an occurrence frequency of a signal defect increases at the time of reproducing a servo signal in a servo system. With respect to this, in the magnetic tape having ΔN of the magnetic layer of 0.25 to 0.40, it is possible to prevent occurrence of the signal defect at the time of reproducing the servo signal in spite of the magnetic layer surface roughness Ra of equal to or smaller than 1.8 nm and the total thickness of equal to or smaller than 5.30 μm. The surmise of the inventor regarding this point will be described later. In addition, the magnetic tape having the magnetic layer surface roughness Ra of equal to or smaller than 1.8 nm can exhibit excellent electromagnetic conversion characteristics. From a viewpoint of further improving the electromagnetic conversion characteristics, the magnetic layer surface roughness Ra is preferably equal to or smaller than 1.7 nm and more preferably equal to or smaller than 1.6 nm. In addition, the magnetic layer surface roughness Ra can be, for example, equal to or greater than 1.2 nm or equal to or greater than 1.3 nm. However, from the viewpoint of improving the electromagnetic conversion characteristics, since the value of the magnetic layer surface roughness Ra is preferably as small as possible, it may be less than the value exemplified above. In the invention and the specification, the "surface (of) the magnetic layer" of the magnetic tape has the same meaning as the surface of the magnetic tape on the magnetic layer side.

The center line average surface roughness Ra measured on the surface of the magnetic layer of the magnetic tape in the invention and the specification is a value measured in an area of 40 μm×40 μm of the surface of the magnetic layer by an atomic force microscope (AFM). As an example of measurement conditions, the following measurement conditions can be used. The magnetic layer surface roughness Ra shown in examples which will be described later is a value measured under the following measurement conditions.

A region having the area of 40 μm×40 μm of the surface of the magnetic layer of the magnetic tape is measured by using the AFM (Nanoscope 4 manufactured by Veeco Instruments Inc.) in a tapping mode. RTESP-300 manufactured by Bruker Japan K.K. is used as a probe, a scan speed (probe moving speed) is 40 μm/sec, and a resolution is 512 pixels× 512 pixels.

The magnetic layer surface roughness Ra can be controlled by a well-known method. For example, the magnetic layer surface roughness Ra can vary depending on sizes of various powder included in the magnetic layer (for example, ferromagnetic powder, non-magnetic powder which can be randomly obtained therein, or the like), manufacturing conditions of the magnetic tape, and the like. Accordingly, the magnetic tape having the magnetic layer surface roughness Ra of equal to or smaller than 1.8 nm can be obtained by adjusting these.

Servo Pattern

The magnetic tape includes a servo pattern in the magnetic layer. The formation of the servo pattern on the magnetic layer is performed by magnetizing a specific position of the magnetic layer by a servo write head. A shape of the servo pattern and disposition thereof in the magnetic layer for realizing the head tracking servo are well known. In regards to the servo pattern of the magnetic layer of the magnetic tape, a well-known technique can be used. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

Hereinafter, as one specific aspect of the head tracking servo, head tracking servo in the timing-based servo system will be described. However, the head tracking servo in the timing-based servo system of the invention is not limited to the following specific aspect.

In the head tracking servo in the timing-based servo system (hereinafter, referred to as "timing-based servo"), a plurality of servo patterns having two or more different shapes are formed on a magnetic layer, and a position of a servo head is recognized by an interval of time in a case where the servo head has read two servo patterns having different shapes and an interval of time in a case where the servo head has read two servo patterns having the same shapes. The position of the magnetic head in the width direction of the magnetic tape is controlled based on the position of the servo head recognized as described above. In an aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
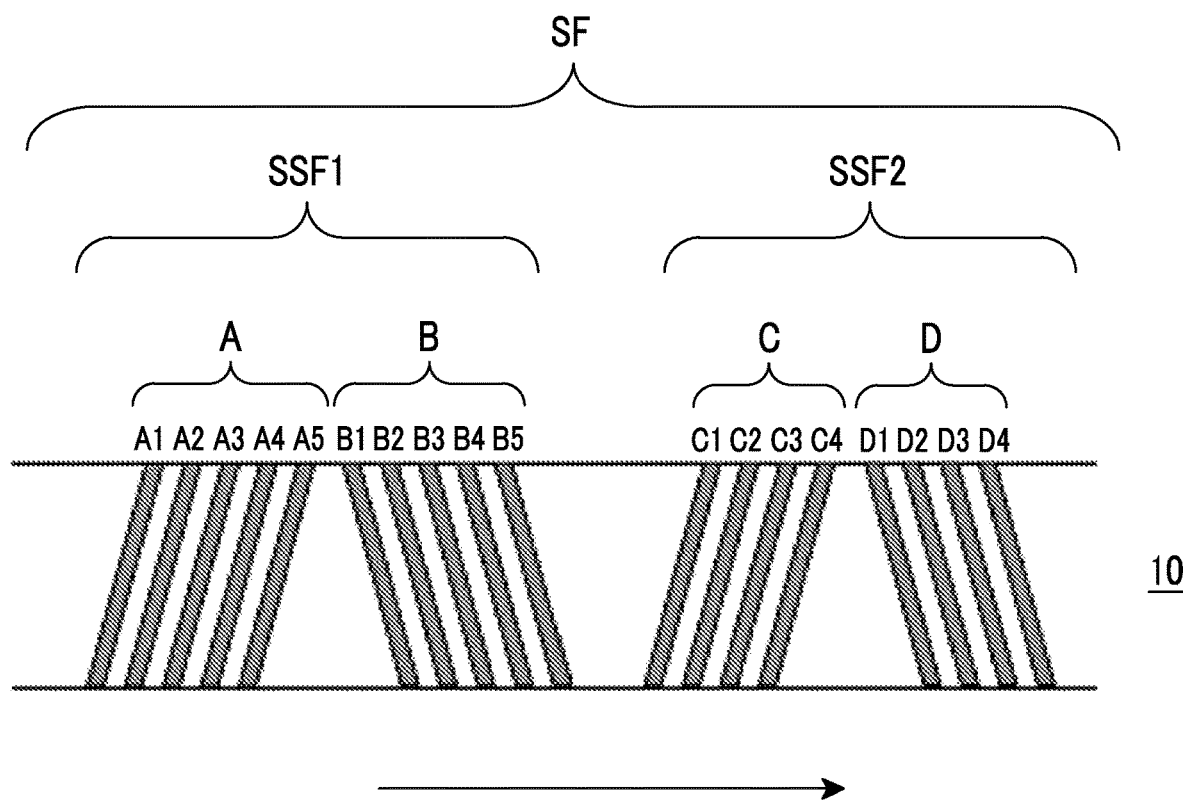
FIG. 2 shows a servo pattern disposition example of a linear-tape-open (LTO) Ultrium format tape.
Figure 3:
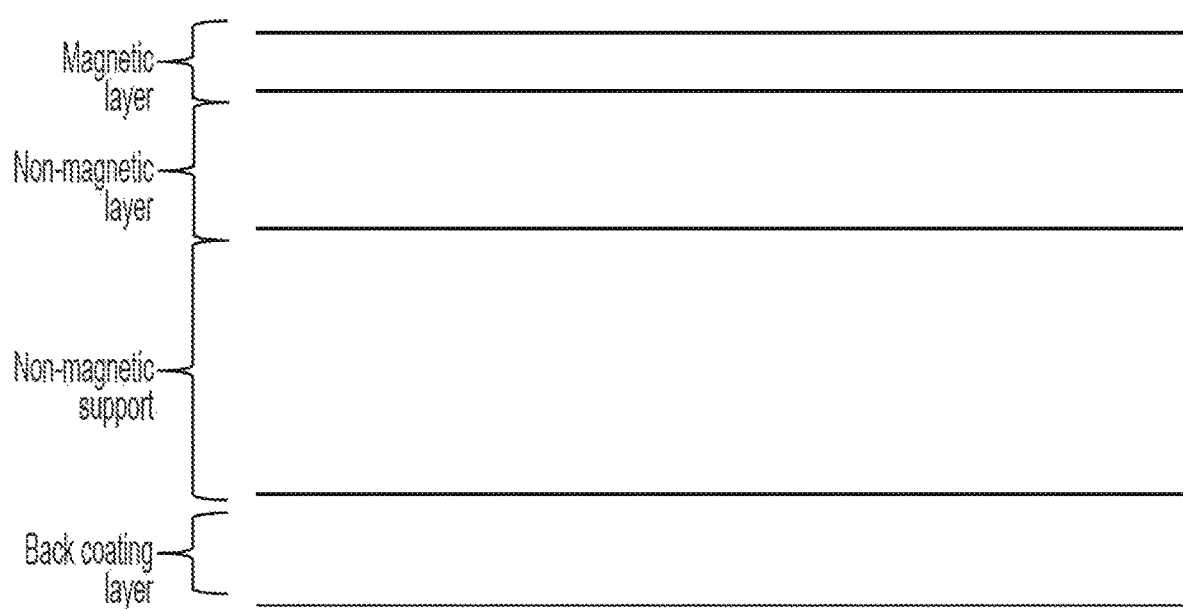
FIG. 3 is a schematic illustration of an embodiment of a magnetic tape of the invention. The magnetic tape has a non-magnetic support, a magnetic layer including ferromagnetic powder and a binding agent on the non-magnetic support, a non-magnetic layer including non-magnetic powder and a binding agent between the non-magnetic support and the magnetic layer, and a back coating layer including non-magnetic powder and a binding agent on the surface of the non-magnetic support opposite to the surface provided with the magnetic layer.
Figure 4:
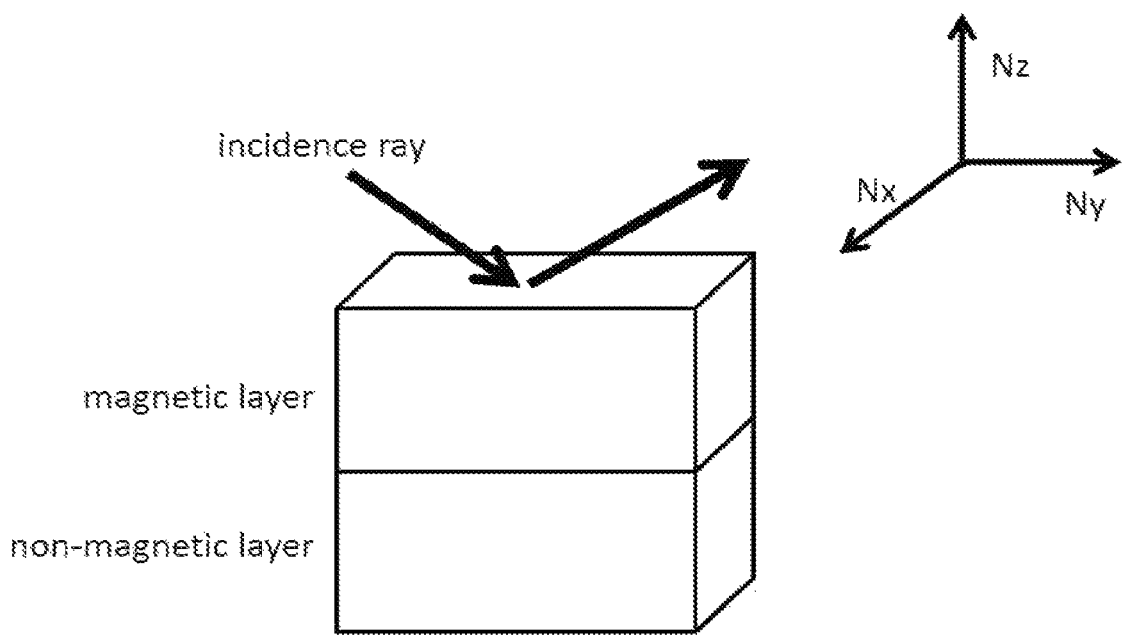
FIG. 4 illustrates a generalized depiction of how the refractive index Nxy of the magnetic layer, measured in an in-plane direction, and the refractive index Nz of the magnetic layer, measured in a thickness direction, are measured. The incidence rays and the Nx, Ny and Nz directions are shown relative to the magnetic tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape apparatus.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The interval of time is normally obtained as an interval of time of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the interval of time is due to a position change of the magnetic tape in the width direction, in a case where the interval of time is deviated from the set value. The set value is an interval of time in a case where the magnetic tape runs without occurring the position change in the width direction. In the timing-based servo system, the magnetic head is moved in the width direction in accordance with a degree of the deviation of the obtained interval of time from the set value. Specifically, as the interval of time is greatly deviated from the set value, the magnetic head is greatly moved in the width direction. This point is applied to not only the aspect shown in FIGS. 1 and 2, but also to entire timing-based servo systems.

For example, in a magnetic tape apparatus using the timing-based servo system, in a case where the signal defect occurs at the time of reproducing the servo signal, it is difficult to obtain measurement results of the interval of time at a location (servo frame) where the defect occurs. As a result, it is partially difficult to position the head by moving the magnetic head in the width direction in a case of recording or reproducing a magnetic signal (information) by a magnetic head by allowing the magnetic tape to run. The occurrence of the signal defect at the time of reproducing the servo signal in the magnetic tape apparatus using the servo system as well as the timing-based servo system makes it difficult to position the head by moving the magnetic head in a case of recording or reproducing a magnetic signal (information) by the magnetic head by allowing the magnetic tape to run.

In regards to the point described above, in the studies of the inventor, it was found that, in the magnetic tape having the total thickness of equal to or smaller than 5.30 μm and the magnetic layer surface roughness Ra of equal to or smaller than 1.8 nm, the signal defect significantly occurs at the time of reproducing the servo signal. The inventor has considered that a reason of the occurrence of the signal defect at the time of reproducing the servo signal is that a smooth sliding between the servo head and the surface of the magnetic layer is hindered (hereinafter, referred to as a "decrease in sliding"). The inventor has surmised that a reason of the decrease in sliding is that the magnetic tape having the total thickness of equal to or smaller than 5.30 μm and the magnetic layer surface roughness Ra of equal to or smaller than 1.8 nm is different from the magnetic tape of the related art in a contact state between the servo head and the surface of the magnetic layer. However, it is merely a surmise.

As a result of the intensive studies of the inventor with respect to this, it was clear that such occurrence of the signal defect at the time of reproducing the servo signal can be prevented by setting ΔN of the magnetic layer to be 0.25 to 0.40. The surmise of the inventor regarding this point will be described later.

ΔN of Magnetic Layer

In the invention and the specification, the absolute value ΔN of the difference between the refractive index Nxy of the magnetic layer, measured in an in-plane direction and the refractive index Nz of the magnetic layer, measured in a thickness direction is a value obtained by the following method.

A refractive index of the magnetic layer in each direction is obtained by a spectral ellipsometry using a double-layer model. In order to obtain a refractive index of the magnetic layer by a spectral ellipsometry using a double-layer model, a value of a refractive index of a portion adjacent to the magnetic layer is used. Hereinafter, an example in a case of obtaining the refractive indexes Nxy and Nz of the magnetic layer in a magnetic tape having a layer configuration in which a non-magnetic layer and a magnetic layer are laminated on a non-magnetic support in this order will be described. However, the magnetic tape according to an aspect of the invention may also be a magnetic tape having a layer configuration in which a magnetic layer is directly laminated on a non-magnetic support without the non-magnetic layer interposed therebetween. Regarding the magnetic tape having such a configuration, a refractive index of the magnetic layer in each direction is obtained in the same manner as the following method, using a double-layer model of a magnetic layer and a non-magnetic support. Moreover, an incidence angle shown below is an incidence angle in a case where an incidence angle is 0° in a case of normal incidence.

(1) Preparation of Sample for Measurement

Regarding a magnetic tape including a back coating layer on a surface of a non-magnetic support on a side opposite to the surface provided with a magnetic layer, the measurement is performed after removing the back coating layer of a sample for measurement cut from the magnetic tape. The removal of the back coating layer can be performed by a well-known method of dissolving of the back coating layer using a solvent or the like. As the solvent, for example, methyl ethyl ketone can be used. However, any solvent which can remove the back coating layer may be used. The surface of the non-magnetic support after removing the back coating layer is roughened by a well-known method so that the reflected light on this surface is not detected, in the measurement of ellipsometer. The roughening can be performed by a well-known method such as polishing the surface of the non-magnetic support after removing the back coating layer by using sand paper, for example. Regarding the sample for measurement cut out from the magnetic tape not including the back coating layer, the surface of the non-magnetic support on a side opposite to the surface provided with the magnetic layer is roughened.

In addition, in order to measure the refractive index of the non-magnetic layer described below, the magnetic layer is further removed and the surface of the non-magnetic layer is exposed. In order to measure the refractive index of the non-magnetic support described below, the non-magnetic layer is also further removed and the surface of the non-magnetic support on the magnetic layer side is exposed. The removal of each layer can be performed by a well-known method so as described regarding the removal of the back coating layer. A longitudinal direction described below is a direction which was a longitudinal direction of the magnetic tape, in a case where the sample for measurement is included in the magnetic tape before being cut out. This point applies to other directions described below, in the same manner.

(2) Measurement of Refractive Index of Magnetic Layer

Δ (phase difference of s-polarized light and p-polarized light) and Ψ (amplitude ratio of s-polarized light and p-polarized light) are measured, using an ellipsometer, by setting an incidence angle to 65°, 70°, and 75° and irradiating a magnetic layer surface with an incidence ray having a beam diameter of 300 μm in a longitudinal direction. The measurement is performed by changing a wavelength of an incidence ray by every 1.5 nm in a range of 400 to 700 nm, and a measurement value at each wavelength is obtained.

The refractive index of the magnetic layer at each wavelength is obtained with a double-layer model as described below, by using the measurement values of Δ and Ψ of the magnetic layer at each wavelength, the refractive index of the non-magnetic layer in each direction obtained by the following method, and the thickness of the magnetic layer.

The zeroth layer which is a substrate of the double-layer model is set as a non-magnetic layer and the first layer thereof is set as a magnetic layer. The double-layer model is created by assuming that there is no effect of rear surface reflection of the non-magnetic layer, by only considering the reflection of the interfaces of air/magnetic layer and magnetic layer/non-magnetic layer. A refractive index of the first layer that most closely matches the obtained measurement value is obtained by fitting the measurement value by a least squares method. A refractive index Nx of the magnetic layer in a longitudinal direction and a refractive index $Nz_1$ of the magnetic layer in a thickness direction measured by emitting an incidence ray in a longitudinal direction are obtained as values at the wavelength of 600 nm obtained from the results of the fitting.

In the same manner as described above, except that a direction in which an incidence ray is incident is set as a width direction of the magnetic tape, a refractive index Ny of the magnetic layer in a width direction and a refractive index $Nz_2$ of the magnetic layer in a thickness direction measured by emitting an incidence ray in a width direction are obtained as values at the wavelength of 600 nm obtained from the results of the fitting.

Fitting is performed by the following method.

In general, "complex refractive index n=η+iκ". Here, η is a real number of the refractive index, κ is an extinction coefficient, and i is an imaginary number. In a case where a complex dielectric constant $\varepsilon=\varepsilon 1+i\varepsilon 2$ ($\varepsilon 1$ and $\varepsilon 2$ satisfies Kramers-Kronig relation), $\varepsilon 1=\eta^2-\kappa^2$, and $\varepsilon 2=2\eta\kappa$, the complex dielectric constant of Nx satisfies that $\varepsilon_x=\varepsilon_x 1+i\varepsilon_x 2$, and the complex dielectric constant of $Nz_1$ satisfies that $\varepsilon_{z1}=\varepsilon_{z1}1+i\varepsilon_{z1}2$, in a case of calculating the Nx and $Nz_1$.

The Nx is obtained by setting $\varepsilon_x 2$ as one Gaussian, setting any point, where a peak position is 5.8 to 5.1 eV and σ is 4 to 3.5 eV, as a starting point, setting a parameter to be offset to a dielectric constant beyond a measurement wavelength range (400 to 700 nm), and performing least squares fitting with respect to the measurement value. In the same manner, $Nz_1$ is obtained by setting any point of $\varepsilon_{z1}2$, where a peak position is 3.2 to 2.9 eV and σ is 1.5 to 1.2 eV, as a starting point, and setting an offset parameter, and performing least squares fitting with respect to the measurement value. Ny and $Nz_2$ are also obtained in the same manner. The refractive index Nxy, measured in an in-plane direction of the magnetic layer is obtained as "Nxy=(Nx+Ny)/2". The refractive index Nz of the magnetic layer, measured in a thickness direction is obtained as "Nz=($Nz_1+Nz_2$)/2". From the obtained Nxy and Nz, the absolute value ΔN of difference thereof is obtained.

(3) Measurement of Refractive Index of Non-Magnetic Layer

Refractive indexes of the non-magnetic layer at a wavelength of 600 nm (the refractive index in the longitudinal direction, the refractive index in the width direction, the refractive index in a thickness direction measured by emitting an incidence ray in a longitudinal direction, and the refractive index in a thickness direction measured by emitting an incidence ray in a width direction) are obtained in the same manner as in the method described above, except the following points.

A wavelength of an incidence ray is changed by every 1.5 nm in the range of 250 to 700 nm.

By using a double-layer model of a non-magnetic layer and a non-magnetic support, the zeroth layer which is a substrate of the double-layer model is set as the non-magnetic support, and the first layer thereof is set as the non-magnetic layer. The double-layer model is created by assuming that there is no effect of rear surface reflection of the non-magnetic support, by only considering the reflection of the interfaces of air/non-magnetic layer and non-magnetic layer/non-magnetic support.

In the fitting, seven peaks (0.6 eV, 2.3 eV, 2.9 eV, 3.6 eV, 4.6 eV, 5.0 eV, and 6.0 eV) are assumed in the imaginary part (ε2) of the complex dielectric constant, and the parameter to be offset is set to the dielectric constant beyond the measurement wavelength range (250 to 700 nm).

(4) Measurement of Refractive Index of Non-Magnetic Support

The refractive indexes of the non-magnetic support at a wavelength of 600 inn (refractive index in the longitudinal direction, the refractive index in the width direction, the refractive index in a thickness direction measured by emitting an incidence ray in a longitudinal direction, and the refractive index in a thickness direction measured by emitting an incidence ray in a width direction) used for obtaining the refractive indexes of the non-magnetic layer by the double-layer model are obtained in the same manner as in the method described above for measuring the refractive index of the magnetic layer, except the following points.

A single-layer model with only front surface reflection is used, without using the double-layer model.

Fitting is performed by a Cauchy model ($n=A+B/\lambda^2$, n is a refractive index, A and B are respectively constants determined by fitting, and λ is a wavelength).

The occurrence of the signal defect at the time of reproducing the servo signal in the magnetic tape having the total thickness of equal to or smaller than 5.30 μm and the magnetic layer surface roughness Ra of equal to or smaller than 1.8 nm can be prevented by setting ΔN of the magnetic layer obtained by the method described above to be 0.25 to 0.40. The occurrence of the signal defect is considered to be caused by the decrease in sliding between the servo head and the surface of the magnetic layer. On the other hand, the inventor has considered that ΔN obtained by the method described above is a value which may be an index of a presence state of the ferromagnetic powder in a surface region of the magnetic layer. This ΔN is surmised as a value which is influenced by the effect of various factors such as a presence state of a binding agent or a density distribution of the ferromagnetic powder, in addition to the alignment state of the ferromagnetic powder in the magnetic layer. In addition, it is considered that the magnetic layer in which the ΔN is set as 0.25 to 0.40 by controlling various factors has a high hardness of the surface of the magnetic layer and the chipping thereof hardly occurs even under the sliding with the servo head. As a result, the inventor has surmised that the prevention of the attachment of the scraps generated due to the chipping of the surface of the magnetic layer as a foreign material onto the servo head contributes to the prevention of the decrease in sliding between the servo head and the surface of the magnetic layer. The inventor has considered that this leads to the prevention of the occurrence of the signal defect. However, this is merely a surmise and the invention is not limited to the surmise.

ΔN of the magnetic layer of the magnetic tape is 0.25 to 0.40. From a viewpoint of further preventing the occurrence of the signal defect, ΔN is preferably 0.25 to 0.35. A specific aspect of means for adjusting ΔN will be described later.

ΔN is an absolute value of a difference between Nxy and Nz. Nxy is a refractive index of the magnetic layer, measured in an in-plane direction and Nz is a refractive index of the magnetic layer, measured in a thickness direction. In an aspect, a relation of Nxy>Nz can be satisfied, and in the other aspect, Nxy<Nz can be satisfied. From a viewpoint of electromagnetic conversion characteristics of the magnetic tape, a relationship of Nxy>Nz is preferable, and therefore, the difference between the Nxy and Nz (Nxy−Nz) is preferably 0.25 to 0.40 and more preferably 0.25 to 0.35. In an aspect, Nxy can be, for example, 1.50 to 2.50. In an aspect, Nz can be, for example, 1.30 to 2.50. However, the magnetic tape may have ΔN of 0.25 to 0.40, and Nxy and Nz are not limited to the ranges exemplified above.

Various means for adjusting ΔN described above will be described later.

Next, the magnetic layer will be described in detail.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used, and ferromagnetic powder having an average particle size equal to or smaller than 40 nm is more preferably used, as the ferromagnetic powder. On the other hand, from a viewpoint of stability of magnetization, the average particle size of the ferromagnetic powder is preferably equal to or greater than 5 nm, more preferably equal to or greater than 10 nm, and even more preferably equal to or greater than 15 mm.

As a preferred specific example of the ferromagnetic powder, hexagonal ferrite powder can be used. The hexagonal ferrite powder can be barium ferrite, strontium ferrite, calcium ferrite, lead ferrite, or the like, or may be a mixed crystal of two or more kinds of these. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

As a preferred specific example of the ferromagnetic powder, metal powder can also be used. For details of the metal powder, descriptions disclosed in paragraphs 0137 to 0141 of JP2011-216149A and paragraphs 0009 to 0023 of JP2005-251351A can be referred to, for example.

As a preferred specific example of the ferromagnetic powder, ε-iron oxide powder can also be used. As a manufacturing method of the ε-iron oxide powder, a manufacturing method from a goethite, a reverse micelle method, and the like are known. All of the manufacturing methods are well known. Regarding a method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. 5280 to 5284, J. Mater. Chem. C, 2013, 1, pp. 5200 to 5206 can be referred, for example. However, the manufacturing method of the ε-iron oxide powder capable of being used as the ferromagnetic powder in the magnetic layer is not limited.

In the invention and the specification, "ferromagnetic powder" means an aggregate of a plurality of ferromagnetic particles. The "aggregation" includes not only an aspect in which the particles constituting the aggregation are in direct contact with each other, but also an aspect in which a binding agent, an additive, and the like are interposed between the particles is also included. The point described above applies to various powder such as the non-magnetic powder in the invention and the specification in the same manner.

In the invention and the specification, average particle sizes of various powder such as the ferromagnetic powder are values measured by the following method with a transmission electron microscope, unless otherwise noted.

The powder is imaged at a magnification ratio of 100,000 with a transmission electron microscope, the image is printed on photographic printing paper so as to have the total magnification ratio of 500,000 to obtain an image of particles constituting the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The value regarding the size of the powder such as the average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting sample powder from the magnetic tape in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles constituting the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

In an aspect, the shape of the ferromagnetic particles constituting the ferromagnetic powder included in the magnetic layer can be a plate shape. Hereinafter, the ferromagnetic powder including the plate-shaped ferromagnetic particles is referred to as a plate-shaped ferromagnetic powder. An average plate ratio of the plate-shaped ferromagnetic powder can be preferably 2.5 to 5.0. The average plate ratio is an arithmetic mean of (maximum long diameter/thickness or height) in a case of the definition (2). As the average plate ratio increases, uniformity of the alignment state of the ferromagnetic particles constituting the plate-shaped ferromagnetic powder tends to easily increase by the alignment process, and the value of ΔN tends to increase.

As an index for a particle size of the ferromagnetic powder, an activation volume can be used. The "activation volume" is a unit of magnetization reversal. Regarding the activation volume described in the invention and the specification, magnetic field sweep rates of a coercivity Hc measurement part at time points of 3 minutes and 30 minutes are measured by using a vibrating sample magnetometer in an environment of an atmosphere temperature 23° C.±1° C., and the activation volume is a value acquired from the following relational expression of Hc and an activation volume V. The activation volume shown in examples which will be described later is a value acquired by performing the measurement using a vibrating sample magnetometer manufactured by Toei Industry Co., Ltd.

$$Hc = 2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

From a viewpoint of improvement of recording density, the activation volume of the ferromagnetic powder is preferably equal to or smaller than 2,500 nm$^3$, more preferably equal to or smaller than 2,300 nm$^3$, and even more preferably equal to or smaller than 2,000 nm$^3$. On the other hand, from a viewpoint of stability of magnetization, the activation volume of the ferromagnetic powder is, for example, preferably equal to or greater than 800 nm$^3$, more preferably equal to or greater than 1,000 nm$^3$, and even more preferably equal to or greater than 1,200 nm$^3$.

The content (filling percentage) of the ferromagnetic powder of the magnetic layer is preferably 50% to 90% by mass and more preferably 60% to 90% by mass. The components other than the ferromagnetic powder of the magnetic layer are at least a binding agent, and one or more kinds of additives may be randomly included. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. In addition, the binding agent may be a radiation curable resin such as an electron beam curable resin. For the radiation curable resin, a description disclosed in paragraphs 0044 and 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)

In an aspect, as the binding agent, a binding agent including an acidic group can be used. The acidic group of the invention and the specification is used as a meaning including a form of a group capable of emitting H$^+$ in water or a solvent including water (aqueous solvent) to be dissociated into anions and a salt thereof. As specific examples of the acidic group, a form of a sulfonic acid group, a sulfuric acid group, a carboxy group, a phosphoric acid group, and a salt thereof can be used. For example, a form of a salt of a sulfonic acid group (—SO$_3$H) means a group represented by —SO$_3$M, where M represents a group representing an atom (for example, alkali metal atom or the like) which may be cations in water or in an aqueous solvent. The same applies to the form of each of salts of the various groups described above. As an example of the binding agent including the acidic group, a resin including at least one kind of acidic group selected from the group consisting of a sulfonic acid group and a salt thereof (for example, a polyurethane resin or a vinyl chloride resin) can be used. However, the resin included in the magnetic layer is not limited to these resins. In addition, in the binding agent including the acidic group, a content of the acidic group can be, for example, 20 to 500 eq/ton. The unit "eq" represents equivalent, and is a unit that cannot be converted into an SI unit. The content of various functional groups such as the acidic group included in the resin can be obtained by a well-known method in accordance with the kind of the functional group. As the binding agent having a great content of the acidic group is used, the value of ΔN tends to increase. The amount of the binding agent used in a magnetic layer forming composition can be, for example, 1.0 to 30.0 parts by mass, and preferably 1.0 to 20.0 parts by mass with respect to 100.0 parts by mass of the ferromagnetic powder. As the amount of the binding agent used with respect to the ferromagnetic powder increases, the value of ΔN tends to increase.

In addition, a curing agent can also be used together with the resin which can be used as the binding agent. As the curing agent, in an aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point also applies to a layer formed by using a composition, in a case where the composition used for forming the other layer includes the curing agent. The preferred curing agent is a thermosetting compound, polyisocyanate being suitable. For details of the polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and a binding agent, and may include one or more kinds of additives, if necessary. As the additives, the curing agent described above is used as an example. In addition, examples of the additive included in the magnetic layer include non-magnetic powder, a lubricant, a dispersing agent, a dispersing assistant, an antibacterial agent, an antistatic agent, an antioxidant, and carbon black. As the additives, a commercially available product can be suitably selected and used according to the desired properties. For example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

The magnetic layer preferably includes one kind or two or more kinds of non-magnetic powders. As the non-magnetic powder, non-magnetic powder (hereinafter, referred to as a "projection formation agent") which can function as a projection formation agent which forms projections suitably protruded from the surface of the magnetic layer can be used. The projection formation agent is a component which can contribute to control of friction properties of the surface of the magnetic layer of the magnetic tape. In addition, the magnetic layer may include non-magnetic powder (hereinafter, referred to as an "abrasive") which can function as an abrasive. The magnetic layer of the magnetic tape preferably includes at least one of the projection formation agent or the abrasive and more preferably includes both of them.

As the projection formation agent, various non-magnetic powders normally used as a projection formation agent can be used. These may be powder of an inorganic substance or powder of an organic substance. In an aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the non-magnetic powder included in the magnetic layer is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at any mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

Meanwhile, the abrasive is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. Regarding the particle size of the abrasive, a specific surface area which is an index of a particle size is, for example, equal to or greater than 14 $m^2/g$, preferably equal to or greater than 16 $m^2/g$, and more preferably equal to or greater than 18 $m^2/g$. In addition, the specific surface area of the abrasive can be, for example, equal to or smaller than 40 $m^2/g$. The specific surface area is a value obtained by a nitrogen adsorption method (also referred to as a Brunauer-Emmett-Teller (BET) one-point method). Hereinafter, the specific surface area obtained by such a method is also referred to as a BET specific surface area.

In addition, from a viewpoint that the projection formation agent and the abrasive can exhibit each function in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition.

Non-Magnetic Layer

Next, the non-magnetic layer will be described. The magnetic tape may include a magnetic layer directly on the non-magnetic support or may include a non-magnetic layer including the non-magnetic powder and the binding agent between the non-magnetic support and the magnetic layer. The non-magnetic powder used in the non-magnetic layer may be powder of inorganic substances or powder of organic substances. In addition, carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technique regarding the non-magnetic layer can be applied. In addition, in regards to the type and the content of the binding agent, and the type and the content of the additive, for example, the well-known technique regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape can also include a back coating layer including non-magnetic powder and a binding agent on a surface of the non-magnetic support opposite to the surface provided with the magnetic layer. The back coating layer preferably includes any one or both of carbon black and inorganic powder. In regards to the binding agent included in the back coating layer and various additives which can be randomly included therein, a well-known technique regarding the back coating layer can be applied, and a well-known technique regarding the list of the magnetic layer and/or the non-magnetic layer can also be applied. For example, for the back coating layer, descriptions disclosed in paragraphs 0018 to 0020 of JP2006-331625A and page 4, line 65 to page 5, line 38, of U.S. Pat. No. 7,029,774B can be referred to.

Various Thicknesses

The total thickness of the magnetic tape is equal to or smaller than 5.30 μm. A thin total thickness (thinning) is preferable for increasing a recording capacity for one reel of the magnetic tape cartridge. The total thickness of the magnetic tape, for example, may be equal to or smaller than 5.20 μm, equal to or smaller than 5.10 μm, or equal to or smaller than 5.00 μm. In addition, the total thickness of the magnetic tape, for example, is preferably equal to or greater than 1.00 μm, more preferably equal to or greater than 2.00 μm, even more preferably equal to or greater than 3.00 μm, and still even more preferably equal to or greater than 4.00 μm from a viewpoint of ease of handling (handleability) of the magnetic tape.

A thickness of the non-magnetic support of the magnetic tape is preferably 3.00 to 4.50 μm. From a viewpoint of high-density recording required in recent years, a thickness of the magnetic layer is preferably equal to or smaller than 0.15 μm and more preferably equal to or smaller than 0.10 μm. A thickness of the magnetic layer is even more preferably 0.01 to 0.10 μm. The magnetic layer may be at least one layer, or the magnetic layer can be separated into two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.10 to 1.50 μm and preferably 0.10 to 1.00 μm.

A thickness of the back coating layer is preferably equal to or smaller than 0.90 μm and more preferably 0.10 to 0.70 μm.

The thicknesses of various layers and the non-magnetic support are obtained by exposing a cross section of the magnetic tape in a thickness direction by a well-known method of ion beams or microtome, and observing the exposed cross section with a scanning transmission electron microscope (STEM). For the specific examples of the measurement method of the thickness, a description disclosed regarding the measurement method of the thickness in examples which will be described later can be referred to.

Manufacturing Step

Preparation of Each Layer Forming Composition

Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technique of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. In addition, the ferromagnetic powder and the abrasive can also be dispersed separately. The separate dispersion is specifically a method of preparing a magnetic layer forming composition through a step of mixing an abrasive solution including an abrasive and a solvent (here, ferromagnetic powder is not substantially included) with a magnetic liquid including the ferromagnetic powder, a solvent, and a binding agent. The expression "ferromagnetic powder is not substantially included" means that the ferromagnetic powder is not added as a constituent component of the abrasive solution, and a small amount of the ferromagnetic powder mixed as impurities without any intention is allowed. Regarding $\Delta N$, as a period of the dispersion time of the magnetic liquid increases, the value of $\Delta N$ tends to increase. This is considered that, as a period of the dispersion time of the magnetic liquid increases, the dispersibility of the ferromagnetic powder in the coating layer of the magnetic layer forming composition increases, and the uniformity of the alignment state of the ferromagnetic particles configuring the ferromagnetic powder by the alignment process tends to easily increase. In addition, as the period of the dispersion time in a case of mixing and dispersing various components of the non-magnetic layer forming composition increases, the value of $\Delta N$ tends to increase. The dispersion time of the magnetic liquid and the dispersion time of the non-magnetic layer forming composition may be set so that ΔN of 0.25 to 0.40 can be realized.

In any stage of preparing each layer forming composition, the filtering may be performed by a well-known method. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. The back coating layer can be formed by applying the back coating layer forming composition onto a side of the non-magnetic support opposite to the side provided with the magnetic layer (or magnetic layer is to be provided). In addition, the coating step for forming each layer can be also performed by being divided into two or more steps. For example, in an aspect, the magnetic layer forming composition can be applied in two or more steps. In this case, a drying process may be performed or may not be performed during the coating steps of two stages. In addition, the alignment process may be performed or may not be performed during the coating steps of two stages. For details of the coating for forming each layer, a description disclosed in a paragraph 0066 of JP2010-231843A can be referred to. In addition, for the drying step after applying the each layer forming composition, a well-known technique can be applied. Regarding the magnetic layer forming composition, as a drying temperature of a coating layer which is formed by applying the magnetic layer forming composition (hereinafter, also referred to as a "coating layer of the magnetic layer forming composition" or simply a "coating layer") decreases, the value of ΔN tends to increase. The drying temperature can be an atmosphere temperature for performing the drying step, for example, and may be set so that ΔN of 0.25 to 0.40 can be realized.

Other Steps

For various other steps for manufacturing the magnetic tape, descriptions disclosed in paragraphs 0067 to 0070 of JP2010-231843A can be referred to.

For example, it is preferable to perform the alignment process with respect to the coating layer of the magnetic layer forming composition while the coating layer is wet. From a viewpoint of ease of exhibiting of ΔN of 0.25 to 0.40, the alignment process is preferably performed by disposing a magnet so that a magnetic field is vertically applied to the surface of the coating layer of the magnetic layer forming composition (that is, homeotropic alignment process). The strength of the magnetic field during the alignment process may be set so that ΔN of 0.25 to 0.40 can be realized. In addition, in a case of performing the coating step of the magnetic layer forming composition by the coating steps of two or more stages, it is preferable to perform the alignment process at least after the final coating step, and it is more preferable to perform the homeotropic alignment process. For example, in a case of forming the magnetic layer by the coating steps of two stages, the drying step is performed without performing the alignment process after the first coating step, and then, the alignment process can be performed with respect to the formed coating layer in the second coating step. For the alignment process, various well-known techniques such as descriptions disclosed in a paragraph 0052 of JP2010-024113A can be used. For example, the homeotropic alignment process can be performed by a well-known method such as a method using a pole opposing magnet. In the alignment zone, a drying speed of the coating layer can be controlled depending on a temperature and an air flow of dry air and/or a transportation speed of the magnetic tape in the alignment zone. In addition, the coating layer may be preliminarily dried before the transportation to the alignment zone.

In addition, the calender process can be performed in any stage after drying the coating layer of the magnetic layer forming composition. For the conditions of the calender process, a description disclosed in a paragraph 0026 of JP2010-231843A can be referred to. As the calender temperature (surface temperature of the calender roll) increases, the value of ΔN tends to increase. As the calender temperature increases, the value of the magnetic layer surface roughness Ra tends to increase. The calender temperature may be set so that ΔN of 0.25 to 0.40 and Ra of equal to or smaller than 1.8 nm can be realized.

Formation of Servo Pattern

The magnetic tape includes a servo pattern in the magnetic layer. Details of the servo pattern are as described above. For example, FIG. 1 shows an example of disposition of a region (servo band) in which the timing-based servo pattern is formed and a region (data band) interposed between two servo bands. FIG. 2 shows an example of disposition of the timing-based servo patterns. Here, the example of disposition shown in each drawing is merely an example, and the servo pattern, the servo bands, and the data bands may be disposed in the disposition according to a system of the magnetic tape apparatus (drive). In addition, for the shape and the disposition of the timing-based servo pattern, a well-known technique such as examples of disposition shown in FIG. 4, FIG. 5, FIG. 6, FIG. 9, FIG. 17, and FIG. 20 of U.S. Pat. No. 5,689,384A can be applied, for example.

The servo pattern can be formed by magnetizing a specific region of the magnetic layer by a servo write head mounted on a servo writer. The direction of magnetization can be the longitudinal direction or a vertical direction (in other words, an in-plane direction) of the magnetic tape. The formation of the servo pattern is normally formed after direct current (DC) demagnetization of the magnetic layer. The direction of demagnetization can be the longitudinal direction or the vertical direction of the magnetic tape. The region magnetized by the servo write head (position where a servo pattern is formed) is determined by standards. As the servo writer, a commercially available servo writer or a servo writer having a well-known configuration can be used. For the configuration of the servo writer, well-known techniques such as techniques disclosed in JP2011-175687A, U.S. Pat. Nos. 5,689,384A, and 6,542,325B can be referred to.

As described above, it is possible to obtain the magnetic tape according to an aspect of the invention. The magnetic tape is normally accommodated in a magnetic tape cartridge and the magnetic tape cartridge is mounted on a magnetic tape apparatus.

Magnetic Tape Cartridge

An aspect of the invention relates to a magnetic tape cartridge including the magnetic tape.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape apparatus (drive) in order to record and/or reproduce information (magnetic signals) on the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of information is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to an aspect of the invention, and a well-known technique can be applied for other configurations.

Magnetic Tape Apparatus

An aspect of the invention relates to a magnetic tape apparatus including the magnetic tape and a magnetic head.

In the invention and the specification, the "magnetic tape apparatus" means a device capable of performing at least one of the recording of information on the magnetic tape or the reproducing of information recorded on the magnetic tape. Such an apparatus is generally called a drive. The magnetic tape apparatus can be a sliding type magnetic tape apparatus. The sliding type apparatus is an apparatus in which the surface of the magnetic layer comes into contact with and slides on the magnetic head, in a case of performing the recording of information on the magnetic tape and/or reproducing of the recorded information.

The magnetic head included in the magnetic tape apparatus can be a recording head capable of performing the recording of information on the magnetic tape, or can be a reproducing head capable of performing the reproducing of information recorded on the magnetic tape. In addition, in an aspect, the magnetic tape apparatus can include both of a recording head and a reproducing head as separate magnetic heads. In another aspect, the magnetic head included in the magnetic tape can also have a configuration of comprising both of a recording element and a reproducing element in one magnetic head. As the reproducing head, a magnetic head (MR head) including a magnetoresistive (MR) element capable of sensitively reading information recorded on the magnetic tape as a reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic tape apparatus.

The details of the magnetic tape mounted on the magnetic tape apparatus are as described above. Such a magnetic tape includes servo patterns. Accordingly, a magnetic signal is recorded on the data band by the magnetic head to form a data track, and/or, in a case of reproducing the recorded signal, head tracking is performed based on the read servo pattern, while reading the servo pattern by the servo head, and therefore, it is possible to cause the magnetic head to follow the data track at a high accuracy.

For details of the head tracking servo of the timing-based servo system, for example, well-known techniques such as techniques disclosed in U.S. Pat. Nos. 5,689,384A, 6,542,325B, and 7,876,521B can be used. In addition, for the details of the head tracking servo in the amplitude-based servo system, well-known techniques disclosed in U.S. Pat. Nos. 5,426,543A and 5,898,533A can be used.

A commercially available magnetic tape apparatus generally includes a magnetic head in accordance to a standard. In addition, a commercially available magnetic tape apparatus generally has a servo controlling mechanism for realizing head tracking of the servo system in accordance to a standard. The magnetic tape apparatus according to an aspect of the invention can be configured by incorporating the magnetic tape according to an aspect of the invention to a commercially available magnetic tape apparatus.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

Example 1

Preparation of Abrasive Solution 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of approximately 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

Preparation of Magnetic Layer Forming Composition

| Magnetic Liquid | |
|---|---|
| Plate-shaped ferromagnetic hexagonal barium ferrite powder activation volume: 1,600 $nm^3$, average plate ratio: 3.5 | 100.0 parts |
| $SO_3Na$ group-containing polyurethane resin Weight-average molecular weight: 70,000, $SO_3Na$ group: | see Table 1 see Table 1 |
| Cyclohexanone | 150.0 parts |
| Methyl ethyl ketone | 150.0 parts |
| Abrasive Solution | |
| Alumina dispersion prepared as described above | 6.0 parts |
| Silica Sol (projection forming agent liquid) | |
| Colloidal silica (average particle size: 100 nm) | 2.0 parts |
| Methyl ethyl ketone | 1.4 parts |
| Other Components | |
| Stearic acid | 2.0 parts |
| Butyl stearate | 2.0 parts |
| Polyisocyanate (CORONATE (registered trademark) manufactured by Tosoh Corporation) | 2.5 parts |
| Finishing Additive Solvent | |
| Cyclohexanone | 200.0 parts |
| Methyl ethyl ketone | 200.0 parts |

Preparation Method

The magnetic liquid was prepared by beads-dispersing of various components of the magnetic liquid described above by using beads as the dispersion medium in a batch type vertical sand mill. The bead dispersion was performed using zirconia beads (bead diameter: see Table 1) as the beads for the time shown in Table 1 (magnetic liquid bead dispersion time).

The magnetic liquid obtained as described above, the abrasive solution, silica sol, other components, and a finishing additive solvent were mixed with each other and beads-dispersed for 5 minutes, and the treatment (ultrasonic dispersion) was performed with a batch type ultrasonic device (20 kHz, 300 W) for 0.5 minutes. After that, the obtained mixed solution was filtered by using a filter having a hole diameter of 0.5 µm, and the magnetic layer forming composition was prepared.

Preparation of Non-Magnetic Layer Forming Composition

Each component among various components of the non-magnetic layer forming composition shown below excluding stearic acid, butyl stearate, cyclohexanone, and methyl ethyl ketone was beads-dispersed (dispersion medium: zirconia beads (bead diameter: 0.1 mm), dispersion time: see Table 1) by using a batch type vertical sand mill to obtain a dispersion liquid. After that, the remaining components were added into the obtained dispersion liquid and stirred with a dissolver. Then, the obtained dispersion liquid was filtered with a filter (hole diameter: 0.5 µm) and a non-magnetic layer forming composition was prepared.

| | |
|---|---|
| Non-magnetic inorganic powder: α-iron oxide | 100.0 parts |
| Average particle size (average major axis length): 0.15 µm | |
| Average acicular ratio: 7 | |
| BET specific surface area: 52 m²/g | |
| Carbon black | 20.0 parts |
| Average particle size: 20 nm | |
| Electron beam curable vinyl chloride copolymer | 13.0 parts |
| Electron beam curable polyurethane resin | 6.0 parts |
| Stearic acid | 1.0 part |
| Butyl stearate | 1.0 part |
| Cyclohexanone | 300.0 parts |
| Methyl ethyl ketone | 300.0 parts |

Preparation of Back Coating Layer Forming Composition

Each component among various components of the back coating layer forming composition shown below excluding stearic acid, butyl stearate, polyisocyanate, and cyclohexanone was kneaded and diluted by an open kneader, and a mixed solution was obtained. After that, the obtained mixed solution was subjected to a dispersion process of 12 passes, with a transverse beads mill and zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (hole diameter: 1.0 µm) and a back coating layer forming composition was prepared.

| | |
|---|---|
| Non-magnetic inorganic powder: α-iron oxide | 80.0 parts |
| Average particle size (average major axis length): 0.15 µm | |
| Average acicular ratio: 7 | |
| BET specific surface area: 52 m²/g | |
| Carbon black | 20.0 parts |
| Average particle size: 20 nm | |
| A vinyl chloride copolymer | 13.0 parts |
| A sulfonic acid salt group-containing polyurethane resin | 6.0 parts |
| Phenylphosphonic acid | 3.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 355.0 parts |

Manufacturing of Magnetic Tape

The non-magnetic layer forming composition was applied and dried onto a polyethylene naphthalate support, and then, an electron beam was emitted with an energy of 40 kGy at an acceleration voltage of 125 kV, to form a non-magnetic layer.

The magnetic layer forming composition was applied on a surface of the formed non-magnetic layer to form a coating layer. A homeotropic alignment process and a drying process were performed by applying a magnetic field having a strength shown in a column of "formation and alignment of magnetic layer" of Table 1 to the surface of the coating layer in a vertical direction by using a pole opposing magnet in an atmosphere at an atmosphere temperature (magnetic layer drying temperature) shown in Table 1, while this coating layer was wet, and a magnetic layer was formed.

After that, the back coating layer forming composition was applied and dried on a surface of the support on a side opposite to the surface on which the non-magnetic layer and the magnetic layer were formed.

Then, a surface smoothing treatment (calender process) was performed with a calender roll configured of only a metal roll, at a calender process speed of 80 m/min, linear pressure of 300 kg/cm (294 kN/m), and a calender temperature (surface temperature of a calender roll) shown in Table 1.

Then, the thermal treatment was performed in the environment of the atmosphere temperature of 70° C. for 36 hours. After the thermal treatment, the slitting was performed so as to have a width of ½ inches (1 inch is 0.0254 meters), and the surface of the magnetic layer was cleaned with a tape cleaning device in which a nonwoven fabric and a razor blade are attached to a device including a sending and winding device of the slit so as to press the surface of the magnetic layer. Then, servo patterns (timing-based servo patterns) having disposition and shapes according to the LTO Ultrium format were formed on the magnetic layer by a commercially available servo writer.

As described above, the magnetic tape of Example 1 was manufactured.

Examples 2 and 4, Comparative Examples 1 to 4 and 6, and Reference Examples 1 to 4

A magnetic tape was manufactured by the same method as that in Example 1, except that various conditions shown in Table 1 were changed as shown in Table 1. The thickness of each layer was adjusted by the coating amount of the each layer forming composition.

In Table 1, in the comparative examples and the reference examples in which "no alignment process" is shown in the column of "formation and alignment of magnetic layer", the magnetic tape was manufactured without performing the alignment process regarding the coating layer of the magnetic layer forming composition.

Example 3

After forming the non-magnetic layer on the polyethylene naphthalate support in the same manner as in Example 1, the magnetic layer forming composition was applied on the surface of the non-magnetic layer so that the thickness after drying becomes 50 nm to form a first coating layer. The first coating layer was passed through the atmosphere at the atmosphere temperature shown in Table 1 (magnetic layer drying temperature) without application of a magnetic field to form a first magnetic layer (no alignment process).

After that, the magnetic layer forming composition was applied on the surface of the first magnetic layer so that the thickness after drying becomes 50 nm to form a second coating layer. A homeotropic alignment process and a drying process were performed by applying a magnetic field having a strength shown in the column of "formation and alignment of magnetic layer" of Table 1 to the surface of the second coating layer in a vertical direction by using a pole opposing magnet in an atmosphere at an atmosphere temperature (magnetic layer drying temperature) shown in Table 1, while this second coating layer was wet, and a second magnetic layer was formed.

A magnetic tape was manufactured by the same method as that in Example 1, except that the multilayered magnetic layer was formed as described above.

Comparative Example 5

After forming the non-magnetic layer on the polyethylene naphthalate support in the same manner as in Example 1, the magnetic layer forming composition was applied on the surface of the non-magnetic layer so that the thickness after drying becomes 50 nm to form a first coating layer. The homeotropic alignment process and the drying process were performed by applying a magnetic field having a strength shown in the column of "formation and alignment of magnetic layer" of Table 1 to the surface of the first coating layer in a vertical direction by using a pole opposing magnet in an atmosphere at an atmosphere temperature (magnetic layer drying temperature) shown in Table 1, while this first coating layer was wet, and a first magnetic layer was formed.

After that, the magnetic layer forming composition was applied on the surface of the first magnetic layer so that the thickness after drying becomes 50 nm to form a second coating layer. The second coating layer was passed through the atmosphere at the atmosphere temperature shown in Table 1 (magnetic layer drying temperature) without application of a magnetic field to form a second magnetic layer (no alignment process).

A magnetic tape was manufactured by the same method as that in Example 1, except that the multilayered magnetic layer was formed as described above.

Measurement Method (1) Magnetic Layer Surface Roughness Ra

A measurement area of 40 μm×40 μm on the surface of the magnetic layer of the magnetic tape was measured by using an atomic force microscope (AFM, Nanoscope 4 manufactured by Veeco Instruments Inc.) in a tapping mode, and a center line average surface roughness Ra (magnetic layer surface roughness Ra) was obtained. RTESP-300 manufactured by Bruker Japan K.K. was used as a probe, a scan speed (probe moving speed) was 40 μm/sec, and a resolution was 512 pixels×512 pixels.

(2) Thicknesses of Non-Magnetic Support and Each Layer

The thicknesses of the magnetic layer, the non-magnetic layer, the non-magnetic support, and the back coating layer of each manufactured magnetic tape were measured by the following method. Table 1 shows the measured various thicknesses and the total magnetic tape thickness calculated from the various thicknesses.

The thicknesses of the magnetic layer, the non-magnetic layer, and the non-magnetic support measured here were used for calculating the following refractive index.

(i) Manufacturing of Cross Section Observation Sample

A cross section observation sample including the entire region in the thickness direction from the magnetic layer side surface of the magnetic tape to the back coating layer side surface was manufactured according to the method disclosed in paragraphs 0193 and 0194 of JP2016-177851A.

(ii) Thickness Measurement

The manufactured sample was observed with the STEM and a STEM image was captured. This STEM image was a STEM-high-angle annular dark field (HAADF) image which is captured at an acceleration voltage of 300 kV and a magnification ratio of imaging of 450,000, and imaging was performed so that the entire region in the thickness direction from the magnetic layer side surface of the magnetic tape to the back coating layer side surface was included in one image. In the STEM image obtained as described above, a linear line connecting both ends of a line segment showing the surface of the magnetic layer to each other was determined as a reference line showing the surface of the magnetic tape on the magnetic layer side. In a case where the STEM image was captured so that the magnetic layer side of the cross section observation sample was positioned on the upper side of the image and the back coating layer side was positioned on the lower side, for example, the linear line connecting both ends of the line segment described above to each other is a linear line connecting an intersection between a left side of the image (shape is a rectangular or square shape) of the STEM image and the line segment, and an intersection between a right side of the STEM image and the line segment to each other. In the same manner as described above, a reference line showing the interface between the magnetic layer and the non-magnetic layer, a reference line showing the interface between the non-magnetic layer and the non-magnetic support, a reference line showing the interface between the non-magnetic support and the back coating layer, and a reference line showing the surface of the magnetic tape on the back coating layer side were determined.

The thickness of the magnetic layer was obtained as the shortest distance from one position randomly selected on the reference line showing the surface of the magnetic tape on the magnetic layer side to the reference line showing the interface between the magnetic layer and the non-magnetic layer. In the same manner as described above, the thicknesses of the non-magnetic layer, the non-magnetic support, and the back coating layer were obtained.

(3) ΔN of Magnetic Layer

Hereinafter, M-2000U manufactured by J. A. Woollam Co. was used as an ellipsometer. Creation and fitting of the double-layer model or the single-layer model were performed using WVASE32 manufactured by J. A. Woollam Co. as analysis software.

(i) Measurement Refractive Index of Non-Magnetic Support

A sample for measurement was cut out from each magnetic tape. The cloth not used was permeated with fresh methyl ethyl ketone, the back coating layer of the sample for measurement was wiped off and removed using this cloth to expose the surface of the non-magnetic support, and then, this surface is roughened with sand paper so that reflected light of the exposed surface is not detected in the measurement which will be performed after this with an ellipsometer.

After that, by causing the cloth to permeate with fresh methyl ethyl ketone, by wiping off and removing the magnetic layer and the non-magnetic layer of the sample for measurement using the cloth and bonding a surface of a silicon wafer and the roughened surface to each other using static electricity, the sample for measurement was disposed on the silicon wafer so that the surface of the non-magnetic support exposed by removing the magnetic layer and the non-magnetic layer (hereinafter, referred to as the "surface of the non-magnetic support on the magnetic layer side") faced upward.

An incidence ray was incident to the surface of the non-magnetic support of the sample for measurement on the magnetic layer side on the silicon wafer using an ellipsometer as described above, to measure D and y. By using the obtained measurement values and the thickness of the non-magnetic support obtained in the section (2), the refractive indexes of the non-magnetic support (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above.

(ii) Measurement of Refractive Index of Non-Magnetic Layer

A sample for measurement was cut out from each magnetic tape. The cloth not used was permeated with methyl ethyl ketone, the back coating layer of the sample for measurement was wiped off and removed using this cloth to expose the surface of the non-magnetic support, and then, this surface is roughened with sand paper so that reflected light of the exposed surface is not detected in the measurement which will be performed after this with the spectroscopic ellipsometer.

After that, the cloth not used was permeated with fresh methyl ethyl ketone, the surface of the magnetic layer of the sample for measurement was wiped off using this cloth, the magnetic layer was removed to expose the surface of the non-magnetic layer, and then, the sample for measurement was disposed on the silicon wafer in the same manner as in the section (i).

The measurement regarding the surface of the non-magnetic layer of the sample for measurement on the silicon wafer was performed using an ellipsometer, and the refractive indexes of the non-magnetic layer (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above in a spectral ellipsometry.

(iii) Measurement of Refractive Index of Magnetic Layer

A sample for measurement was cut out from each magnetic tape. The cloth not used was permeated with fresh methyl ethyl ketone, the back coating layer of the sample for measurement was wiped off and removed using this cloth to expose the surface of the non-magnetic support, and then, this surface is roughened with sand paper so that reflected light of the exposed surface is not detected in the measurement which will be performed after this with the spectroscopic ellipsometer.

After that, the sample for measurement was disposed on the sample for measurement on the silicon wafer, in the same manner as in the section (i).

The measurement regarding the surface of the magnetic layer of the sample for measurement on the silicon wafer was performed using an ellipsometer, and the refractive indexes of the magnetic layer (the refractive index Nx in a longitudinal direction, the refractive index Ny in a width direction, the refractive index $Nz_1$ in a thickness direction measured by incidence of incidence ray in the longitudinal direction, and the refractive index $Nz_2$ in a thickness direction measured by incidence of incidence ray in the width direction) were obtained by the method described above in a spectral ellipsometry. Nxy and Nz were obtained from the obtained values, and the absolute value ΔN of the difference of these values was obtained. Regarding all of magnetic tapes of the examples, the comparative examples, and the reference examples, the obtained Nxy was a value greater than Nz (that is, Nxy>Nz).

(4) Vertical Squareness Ratio (SQ)

A vertical squareness ratio of the magnetic tape is a squareness ratio measured in a vertical direction of the magnetic tape. The "vertical direction" described regarding the squareness ratio is a direction orthogonal to the surface of the magnetic layer. Regarding each magnetic tape of the examples, the comparative examples, and the reference examples, the vertical squareness ratio was obtained by sweeping an external magnetic field in the magnetic tape at a measurement temperature of 23° C. 1° C. using an vibrating sample magnetometer (manufactured by Toei Industry Co., Ltd.) under conditions of a maximum external magnetic field of 1194 kA/m (15 kOe) and a scan speed of 4.8 kA/m/sec (60 Oe/sec). The measurement value is a value after diamagnetic field correction, and is obtained as a value obtained by subtracting magnetization of a sample probe of the vibrating sample magnetometer as background noise. In an aspect, the vertical squareness ratio of the magnetic tape is preferably 0.60 to 1.00. In addition, in an aspect, the vertical squareness ratio of the magnetic tape can be, for example, equal to or smaller than 0.90, equal to or smaller than 0.85, or equal to or smaller than 0.80, and can also be greater than these values.

(5) Occurrence Frequency of Signal Defect (thermal asperity) at time of Reproducing Servo Signal The magnetic tapes of the examples, the comparative examples, and the reference examples were attached to a servo tester. In the servo tester, the reading of the servo patterns (reproducing of servo signals) was performed by the servo head by allowing each magnetic tape to run and the surface of the magnetic layer of the running magnetic tape and the servo head on which the MR element is mounted to come into contact with each other and sliding. In a reproduced waveform of the servo signal obtained by the reproduction, a part that is not a normal burst signal and shows an output of equal to or greater than 200% with an average value of a noise level output as 100% is determined as thermal asperity, and the number of thermal asperities was counted. A value (number of times/m) obtained by dividing the counted number of thermal asperities by total length of the magnetic tape is defined as the occurrence frequency of the signal defect (thermal asperity).

The results are shown in Table 1 (Table 1-1 to Table 1-4).

TABLE 1-1

|  | Example 1 | Example 2 | Example 3 | Example 4 |
|---|---|---|---|---|
| Magnetic layer thickness (μm) | 0.10 | 0.10 | 0.10 | 0.10 |
| Non-magnetic layer thickness (μm) | 0.70 | 0.50 | 0.70 | 0.70 |
| Non-magnetic support thickness (μm) | 4.20 | 4.00 | 4.20 | 4.20 |
| Back coating layer thickness (μm) | 0.30 | 0.30 | 0.30 | 0.30 |
| Magnetic tape total thickness (μm) | 5.30 | 4.90 | 5.30 | 5.30 |
| Magnetic liquid bead dispersion time | 50 hours | 50 hours | 50 hours | 50 hours |
| Magnetic liquid dispersion bead diameter | 0.1 mm | 0.1 mm | 0.1 mm | 0.1 mm |
| Magnetic liquid Content of $SO_3Na$ group of polyurethane resin | 330 eq/ton | 330 eq/ton | 330 eq/ton | 330 eq/ton |
| Magnetic liquid Content of $SO_3Na$ group-containing polyurethane resin | 15.0 parts | 15.0 parts | 15.0 parts | 15.0 parts |
| Non-magnetic layer forming composition dispersion time | 24 hours | 24 hours | 24 hours | 24 hours |
| Magnetic layer drying temperature | 50° C. | 50° C. | 50° C. | 50° C. |
| Calender temperature | 100° C. | 100° C. | 100° C. | 100° C. |
| Formation and alignment of magnetic layer | Homeotropic alignment 0.5 T | Homeotropic alignment 0.5 T | Second magnetic layer: homeotropic alignment 0.5 T/ First magnetic layer: no alignment process | Homeotropic alignment 0.2 T |
| Magnetic layer surface roughness Ra (nm) | 1.8 | 1.8 | 1.8 | 1.8 |
| Vertical squareness ratio (SQ) | 0.66 | 0.66 | 0.60 | 0.60 |
| Nxy | 1.90 | 1.90 | 1.95 | 1.90 |
| Nz | 1.60 | 1.60 | 1.60 | 1.65 |
| ΔN | 0.30 | 0.30 | 0.35 | 0.25 |
| Occurrence frequency of signal defect (thermal asperity) (number of times/m) | 0.10 | 0.15 | 0.10 | 0.05 |

TABLE 1-2

|  | Comparative Example 1 | Comparative Example 2 | Comparative Example 3 |
|---|---|---|---|
| Magnetic layer thickness (μm) | 0.10 | 0.10 | 0.10 |
| Non-magnetic layer thickness (μm) | 0.70 | 0.50 | 0.50 |
| Non-magnetic support thickness (μm) | 4.20 | 4.00 | 4.00 |
| Back coating layer thickness (μm) | 0.30 | 0.30 | 0.30 |
| Magnetic tape total thickness (μm) | 5.30 | 4.90 | 4.90 |
| Magnetic liquid bead dispersion time | 6 hours | 6 hours | 6 hours |
| Magnetic liquid dispersion bead diameter | 1.0 mm | 1.0 mm | 1.0 mm |
| Magnetic liquid Content of $SO_3Na$ group of polyurethane resin | 60 eq/ton | 60 eq/ton | 60 eq/ton |
| Magnetic liquid Content of $SO_3Na$ group-containing polyurethane resin | 25.0 parts | 25.0 parts | 25.0 parts |
| Non-magnetic layer forming composition dispersion time | 3 hours | 3 hours | 3 hours |
| Magnetic layer drying temperature | 70° C. | 70° C. | 70° C. |
| Calender temperature | 100° C. | 100° C. | 105° C. |
| Formation and alignment of magnetic layer | No alignment process | No alignment process | No alignment process |
| Magnetic layer surface roughness Ra (nm) | 1.8 | 1.8 | 1.6 |
| Vertical squareness ratio (SQ) | 0.50 | 0.50 | 0.50 |
| Nxy | 1.90 | 1.90 | 1.90 |
| Nz | 1.80 | 1.80 | 1.80 |
| ΔN | 0.10 | 0.10 | 0.10 |
| Occurrence frequency of signal defect (thermal asperity) (number of times/m) | 1.00 | 1.50 | 7.50 |

TABLE 1-3

|  | Comparative Example 4 | Comparative Example 5 | Comparative Example 6 |
|---|---|---|---|
| Magnetic layer thickness (μm) | 0.10 | 0.10 | 0.10 |
| Non-magnetic layer thickness (μm) | 0.70 | 0.70 | 0.70 |
| Non-magnetic support thickness (μm) | 4.20 | 4.20 | 4.20 |
| Back coating layer thickness (μm) | 0.30 | 0.30 | 0.30 |
| Magnetic tape total thickness (μm) | 5.30 | 5.30 | 5.30 |
| Magnetic liquid bead dispersion time | 50 hours | 50 hours | 96 hours |
| Magnetic liquid dispersion bead diameter | 0.1 mm | 0.1 mm | 0.1 mm |
| Magnetic liquid Content of $SO_3Na$ group of polyurethane resin | 330 eq/ton | 330 eq/ton | 330 eq/ton |
| Magnetic liquid Content of $SO_3Na$ group-containing polyurethane resin | 15.0 parts | 15.0 parts | 10.0 parts |
| Non-magnetic layer forming composition dispersion time | 24 hours | 24 hours | 48 hours |
| Magnetic layer drying temperature | 50° C. | 50° C. | 30° C. |
| Calender temperature | 100° C. | 100° C. | 110° C. |
| Formation and alignment of magnetic layer | No alignment process | Second magnetic layer: no alignment process/ First magnetic layer: homeotropic alignment 0.5 T | Homeotropic alignment 0.5 T |
| Magnetic layer surface roughness Ra (nm) | 1.8 | 1.8 | 1.5 |
| Vertical squareness ratio (SQ) | 0.53 | 0.60 | 0.80 |
| Nxy | 1.90 | 1.90 | 2.20 |
| Nz | 1.70 | 1.70 | 1.75 |
| ΔN | 0.20 | 0.20 | 0.45 |
| Occurrence frequency of signal defect (thermal asperity) (number of times/m) | 8.00 | 10.00 | 13.00 |

TABLE 1-4

|  | Reference Example 1 | Reference Example 2 | Reference Example 3 | Reference Example 4 |
|---|---|---|---|---|
| Magnetic layer thickness (μm) | 0.10 | 0.10 | 0.10 | 0.10 |
| Non-magnetic layer thickness (μm) | 1.00 | 0.70 | 0.70 | 0.50 |
| Non-magnetic support thickness (μm) | 4.30 | 4.20 | 4.20 | 4.00 |
| Back coating layer thickness (μm) | 0.60 | 0.40 | 0.30 | 0.30 |
| Magnetic tape total thickness (μm) | 6.00 | 5.40 | 5.30 | 4.90 |
| Magnetic liquid bead dispersion time | 6 hours | 6 hours | 6 hours | 6 hours |
| Magnetic liquid dispersion bead diameter | 1.0 mm | 1.0 mm | 1.0 mm | 1.0 mm |
| Magnetic liquid Content of $SO_3Na$ group of polyurethane resin | 60 eq/ton | 60 eq/ton | 60 eq/ton | 60 eq/ton |
| Magnetic liquid Content of $SO_3Na$ group-containing polyurethane resin | 25.0 parts | 25.0 parts | 25.0 parts | 25.0 parts |
| Non-magnetic layer forming composition dispersion time | 3 hours | 3 hours | 3 hours | 3 hours |
| Magnetic layer drying temperature | 70° C. | 70° C. | 70° C. | 70° C. |
| Calender temperature | 100° C. | 100° C. | 90° C. | 90° C. |
| Formation and alignment of magnetic layer | No alignment process | No alignment process | No alignment process | No alignment process |
| Magnetic layer surface roughness Ra (nm) | 1.8 | 1.8 | 2.2 | 2.2 |
| Vertical squareness ratio (SQ) | 0.50 | 0.50 | 0.50 | 0.50 |
| Nxy | 1.90 | 1.90 | 1.90 | 1.90 |
| Nz | 1.80 | 1.80 | 1.80 | 1.80 |
| ΔN | 0.10 | 0.10 | 0.10 | 0.10 |
| Occurrence frequency of signal defect (thermal asperity) (number of times/m) | 0.08 | 0.10 | 0.05 | 0.12 |

By comparison of Reference Examples 1 to 4 and Comparative Examples 1 to 6 with each other, in a case where the total thickness of the magnetic tape is equal to or smaller than 5.30 μm and the magnetic layer surface roughness Ra is equal to or smaller than 1.8 nm compared to a case where the total thickness of the magnetic tape is greater than 5.30 μm (Reference Examples 1 and 2) and a case where the magnetic layer surface roughness Ra is greater than 1.8 nm (Reference Examples 3 and 4), it was confirmed that the occurrence frequency of the signal defect significantly increases at the time of reproducing the servo signal (Comparative Examples 1 to 6).

With respect to this, the magnetic tapes of Examples 1 to 4 have the total thickness of equal to or smaller than 5.30 μm and the magnetic layer surface roughness Ra of equal to or smaller than 1.8 nm, but the occurrence frequency of the signal defect was greatly reduced at the time of reproducing the servo signal compared to the magnetic tapes of Comparative Examples 1 to 6.

In general, the squareness ratio is known as an index for a state of the ferromagnetic powder present in the magnetic layer. However, as shown in Table 1, even in a case of the magnetic tapes having the same vertical squareness ratios, ΔN's are different from each other (for example, Examples 3 and 4 and Comparative Example 5). The inventor has considered that this shows that ΔN is a value which is affected by other factors, in addition to the state of the ferromagnetic powder present in the magnetic layer.

An aspect of the invention is effective in a technical field of magnetic tapes for high-density recording.

What is claimed is:

1. A magnetic tape comprising:
a non-magnetic support; and
a magnetic layer including ferromagnetic powder and a binding agent on the non-magnetic support,
wherein a total thickness of the magnetic tape is equal to or smaller than 5.30 μm,
the magnetic layer has a servo pattern,
a center line average surface roughness Ra measured on a surface of the magnetic layer is equal to or smaller than 1.8 nm, and
an absolute value ΔN of a difference between a refractive index Nxy of the magnetic layer, measured in an in-plane direction and a refractive index Nz of the magnetic layer, measured in a thickness direction is 0.25 to 0.40.

2. The magnetic tape according to claim 1,
wherein a difference Nxy−Nz between the refractive index Nxy and the refractive index Nz is 0.25 to 0.40.

3. The magnetic tape according to claim 1, further comprising:
a non-magnetic layer including non-magnetic powder and a binding agent between the non-magnetic support and the magnetic layer.

4. The magnetic tape according to claim 1,
wherein the total thickness of the magnetic tape is 3.00 μm to 5.30 μm.

5. The magnetic tape according to claim 1, further comprising:
a back coating layer including non-magnetic powder and a binding agent on a surface of the non-magnetic support opposite to a surface provided with the magnetic layer.

6. The magnetic tape according to claim 1,
wherein the center line average surface roughness Ra measured on the surface of the magnetic layer is 1.2 nm to 1.8 nm.

7. The magnetic tape according to claim 1,
wherein the servo pattern is a timing-based servo pattern.

8. A magnetic tape cartridge comprising:
a magnetic tape, which comprises:
a non-magnetic support; and
a magnetic layer including ferromagnetic powder and a binding agent on the non-magnetic support,
wherein a total thickness of the magnetic tape is equal to or smaller than 5.30 μm,
the magnetic layer has a servo pattern,
a center line average surface roughness Ra measured on a surface of the magnetic layer is equal to or smaller than 1.8 nm, and
an absolute value ΔN of a difference between a refractive index Nxy of the magnetic layer, measured in an in-plane direction and a refractive index Nz of the magnetic layer, measured in a thickness direction is 0.25 to 0.40.

9. The magnetic tape cartridge according to claim 8,
wherein a difference Nxy−Nz between the refractive index Nxy and the refractive index Nz is 0.25 to 0.40.

10. The magnetic tape cartridge according to claim 8,
wherein the magnetic tape further comprises:
a non-magnetic layer including non-magnetic powder and a binding agent between the non-magnetic support and the magnetic layer.

11. The magnetic tape cartridge according to claim 8,
wherein the total thickness of the magnetic tape is 3.00 μm to 5.30 μm.

12. The magnetic tape cartridge according to claim 8,
wherein the magnetic tape further comprises:
a back coating layer including non-magnetic powder and a binding agent on a surface of the non-magnetic support opposite to a surface provided with the magnetic layer.

13. The magnetic tape cartridge according to claim 8,
wherein the center line average surface roughness Ra measured on the surface of the magnetic layer is 1.2 nm to 1.8 nm.

14. The magnetic tape cartridge according to claim 8,
wherein the servo pattern is a timing-based servo pattern.

15. A magnetic tape apparatus comprising:
a magnetic head; and
a magnetic tape, which comprises:
a non-magnetic support; and
a magnetic layer including ferromagnetic powder and a binding agent on the non-magnetic support,
wherein a total thickness of the magnetic tape is equal to or smaller than 5.30 μm,
the magnetic layer has a servo pattern,
a center line average surface roughness Ra measured on a surface of the magnetic layer is equal to or smaller than 1.8 nm, and
an absolute value ΔN of a difference between a refractive index Nxy of the magnetic layer, measured in an in-plane direction and a refractive index Nz of the magnetic layer, measured in a thickness direction is 0.25 to 0.40.

16. The magnetic tape apparatus according to claim 15,
wherein a difference Nxy−Nz between the refractive index Nxy and the refractive index Nz is 0.25 to 0.40.

17. The magnetic tape apparatus according to claim 15,
wherein the magnetic tape further comprises:
a non-magnetic layer including non-magnetic powder and a binding agent between the non-magnetic support and the magnetic layer, and
a back coating layer including non-magnetic powder and a binding agent on a surface of the non-magnetic support opposite to a surface provided with the magnetic layer.

18. The magnetic tape apparatus according to claim 15,
wherein the total thickness of the magnetic tape is 3.00 μm to 5.30 μm.

19. The magnetic tape apparatus according to claim 15,
wherein the center line average surface roughness Ra measured on the surface of the magnetic layer is 1.2 nm to 1.8 nm.

20. The magnetic tape apparatus according to claim 15, wherein the servo pattern is a timing-based servo pattern.

* * * * *